(12) United States Patent
Ogawa et al.

(10) Patent No.: US 10,819,169 B2
(45) Date of Patent: Oct. 27, 2020

(54) AXIAL GAP ROTATING ELECTRICAL MACHINE AND MANUFACTURING METHOD FOR THE SAME

(71) Applicant: MITSUBISHI ELECTRIC CORPORATION, Chiyoda-ku (JP)

(72) Inventors: Toru Ogawa, Chiyoda-ku (JP); Hideaki Arita, Chiyoda-ku (JP); Akihiro Daikoku, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 67 days.

(21) Appl. No.: 15/774,020

(22) PCT Filed: Mar. 31, 2016

(86) PCT No.: PCT/JP2016/060727
§ 371 (c)(1),
(2) Date: May 7, 2018

(87) PCT Pub. No.: WO2017/094271
PCT Pub. Date: Jun. 8, 2017

(65) Prior Publication Data
US 2018/0323663 A1 Nov. 8, 2018

(30) Foreign Application Priority Data

Dec. 3, 2015 (JP) .................................. 2015-236443

(51) Int. Cl.
*H02K 1/18* (2006.01)
*H02K 1/16* (2006.01)
(Continued)

(52) U.S. Cl.
CPC ............. *H02K 1/182* (2013.01); *H02K 1/145* (2013.01); *H02K 1/16* (2013.01); *H02K 1/2793* (2013.01);
(Continued)

(58) Field of Classification Search
CPC .... H02K 15/024; H02K 15/085; H02K 16/04; H02K 1/145; H02K 1/16; H02K 1/182; H02K 1/2793; H02K 21/24
(Continued)

(56) References Cited

U.S. PATENT DOCUMENTS

| 2011/0316381 A1* | 12/2011 | Asano | H02K 1/148 |
| | | | 310/216.045 |
| 2012/0086303 A1* | 4/2012 | Hsu | H02K 1/182 |
| | | | 310/216.113 |
| 2012/0286619 A1* | 11/2012 | Tsuiki | H02K 3/522 |
| | | | 310/215 |

FOREIGN PATENT DOCUMENTS

| JP | 2005-312124 A | 11/2005 |
| JP | 2009-136056 A | 6/2009 |
| JP | 2010-154610 A | 7/2010 |

OTHER PUBLICATIONS

International Search Report dated Jun. 28, 2016 in PCT/JP2016/060727, filed on Mar. 31, 2016.
(Continued)

*Primary Examiner* — Alex W Mok
(74) *Attorney, Agent, or Firm* — Xsensus LLP

(57) ABSTRACT

An axial gap rotating electrical machine, including: a rotor; a stator which includes a stator iron core, the stator iron core including: a core back having a hollow-disc shape; and a plurality of teeth, which axially extend from one axial surface of the core back, and are arrayed circumferentially, the plurality of teeth having distal ends axially facing the rotor; a housing having a bottom on which another axial surface of the core back, which is a surface axially opposite to the one axial surface of the core back, is superposed; and a fixing member, which is fixed to the bottom at a position
(Continued)

radially shifted from the core back, and is configured to press the one axial surface of the core back toward the bottom.

21 Claims, 17 Drawing Sheets

(51) Int. Cl.
*H02K 1/27* (2006.01)
*H02K 15/02* (2006.01)
*H02K 15/085* (2006.01)
*H02K 16/04* (2006.01)
*H02K 21/24* (2006.01)
*H02K 1/14* (2006.01)

(52) U.S. Cl.
CPC ......... *H02K 15/024* (2013.01); *H02K 15/085* (2013.01); *H02K 16/04* (2013.01); *H02K 21/24* (2013.01)

(58) Field of Classification Search
USPC .................................................. 310/156.35
See application file for complete search history.

(56) References Cited

OTHER PUBLICATIONS

Combined Office Action and Search Report dated Jul. 24, 2019 in Chinese Patent Application No. 201680069604.9 (with unedited computer generated English translation of the Office Action and English translation of categories of cited documents), 18 pages.

* cited by examiner

AXIAL GAP ROTATING ELECTRICAL MACHINE AND MANUFACTURING METHOD FOR THE SAME

TECHNICAL FIELD

The present invention relates to an axial gap rotating electrical machine which includes a rotor and a stator axially facing each other, and a manufacturing method for the same.

BACKGROUND ART

Hitherto, there has been known an axial gap rotating electrical machine which includes a rotor, a stator axially facing the rotor, and a housing having the stator fixed thereto, and in which the stator is fixed to the housing with an adhesive (for example, see Patent Literature 1.)

CITATION LIST

Patent Literature

[PTL 1] JP 2010-154610 A

SUMMARY OF INVENTION

Technical Problem

However, there has been a problem in that the fixation of the stator to the housing with the adhesive causes decrease in fixation strength between the stator and the housing when an ambient temperature rises.

The present invention is to provide an axial gap rotating electrical machine which enables improvement in fixation strength between a stator and a housing, and a manufacturing method for the same.

Solution to Problem

According to one embodiment of the present invention, there is provided an axial gap rotating electrical machine, including: a rotor; a stator which includes a stator iron core, the stator iron core including: a core back having a hollow-disc shape; and a plurality of teeth, which axially extend from one axial surface of the core back, and are arrayed circumferentially, the plurality of teeth having distal ends axially facing the rotor; a housing having a bottom on which another axial surface of the core back, which is a surface axially opposite to the one axial surface of the core back, is superposed; and a fixing member, which is fixed to the bottom at a position radially shifted from the core back, and is configured to press the one axial surface of the core back toward the bottom.

Advantageous Effects of Invention

According to the axial gap rotating electrical machine of the present invention, the fixing member fixed to the housing presses the core back toward the bottom of the housing, thereby enabling improvement in fixation strength between the stator and the housing.

DESCRIPTION OF EMBODIMENTS

First Embodiment

Figure 1:
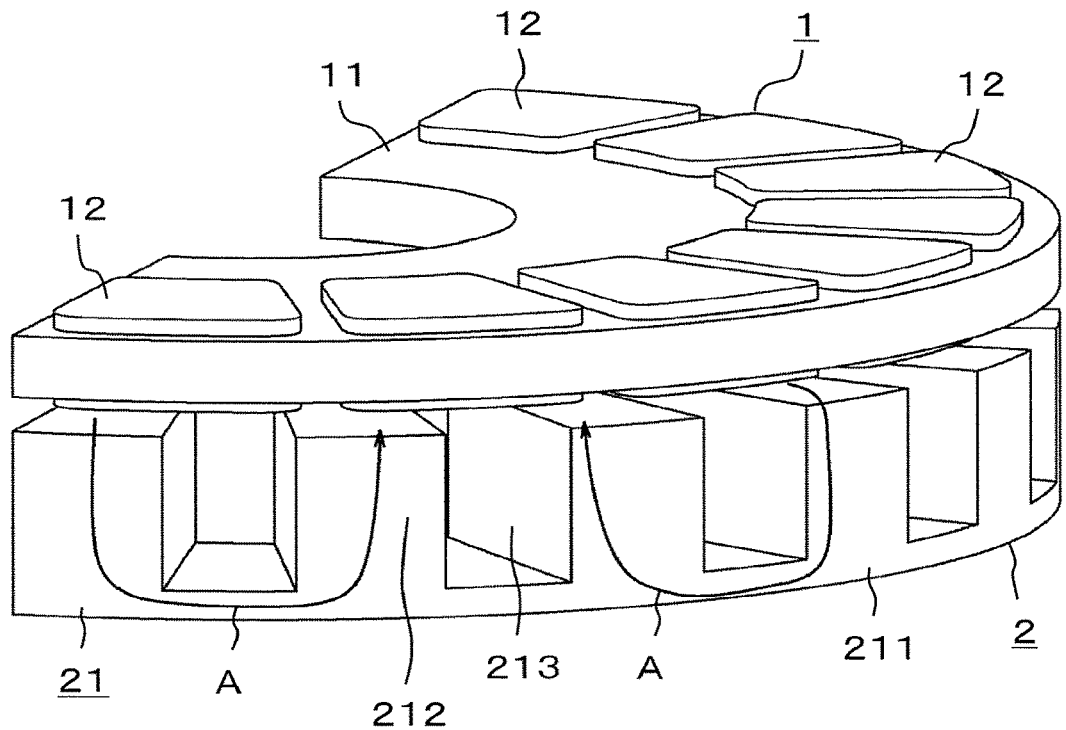
FIG. 1 is a part cutaway perspective view for illustrating a main part of an axial gap rotating electrical machine according to a first embodiment of the present invention.
Figure 2:
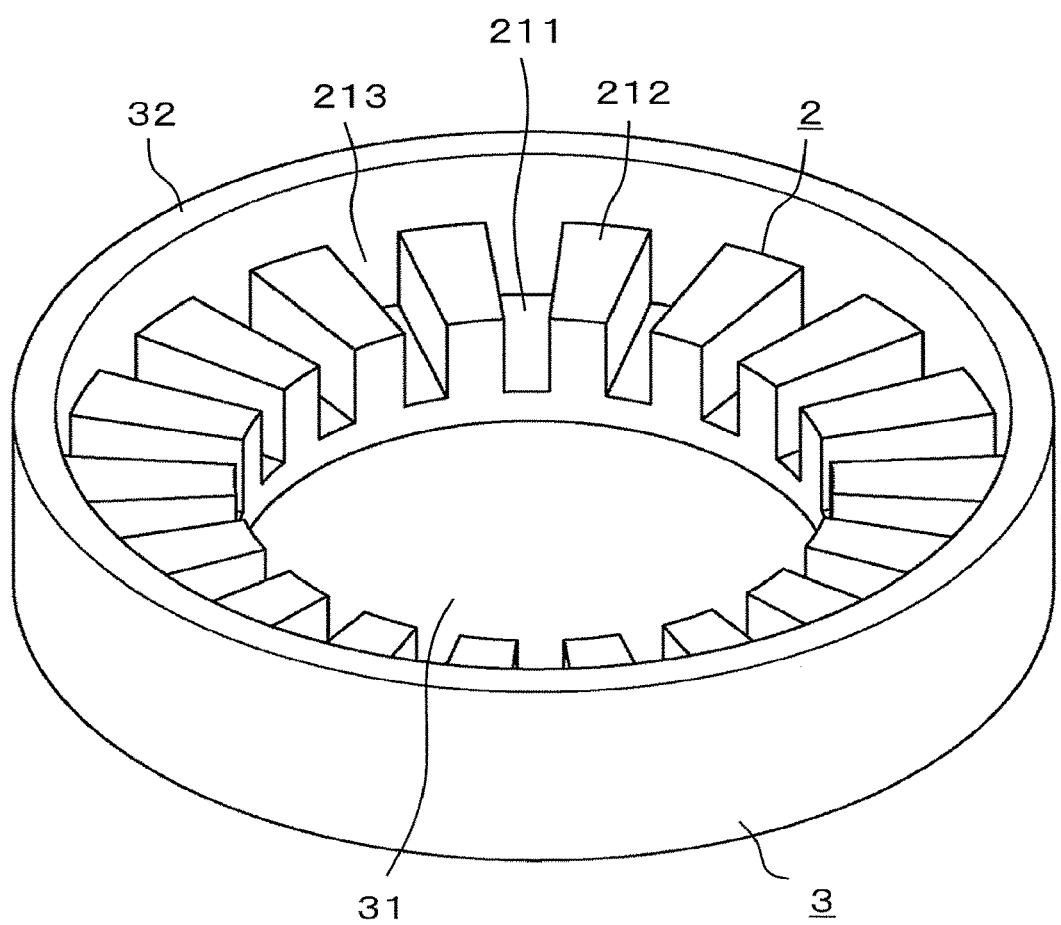
FIG. 2 is a perspective view for illustrating a main part of the axial gap rotating electrical machine of FIG. 1.

FIG. 1 is a part cutaway perspective view for illustrating a main part of an axial gap rotating electrical machine according to a first embodiment of the present invention, and FIG. 2 is a perspective view for illustrating a main part of the axial gap rotating electrical machine of FIG. 1. In the first embodiment, the axial gap rotating electrical machine is a permanent magnet synchronous rotating electrical machine. The axial gap rotating electrical machine includes a rotor 1, a stator 2 axially facing the rotor 1, and a housing 3 having the stator 2 fixed thereto. The housing 3 is not illustrated in FIG. 1, and the rotor 1 is not illustrated in FIG. 2. The rotor 1 is fixed to a shaft (not shown). The shaft is formed of a massive magnetic body made of, for example, iron. Both axial ends of the shaft are rotatably supported by the housing 3 via a pair of bearings (not shown). The shaft may be formed of a non-magnetic body.

The rotor 1 includes a permanent magnet holding body 11 and a plurality of permanent magnets 12. The permanent magnet holding body 11 has a hollow-disc shape. The plurality of permanent magnets 12 are fixed to the permanent magnet holding body 11. The permanent magnet holding body 11 is fixed to the shaft such that an axis of the permanent magnet holding body 11 and an axis of the shaft overlap with each other. The plurality of permanent magnets 12 are arrayed circumferentially at equal intervals in a radially intermediate portion of the permanent magnet holding body 11.

As seen in an axial direction, the permanent magnet 12 has a fan shape having a circumferential length increasing as approaching the radially outer side of the permanent magnet holding body 11. Each permanent magnet 12 is magnetized in the axial direction such that the axial end surface becomes a north pole or a south pole. The plurality of permanent magnets 12 are arranged such that the north poles and the south poles are circumferentially alternate as seen in the axial direction.

Although one stator 2 is illustrated in FIG. 1, this axial gap rotating electrical machine includes a pair of stators 2 arranged axially separate from each other. The rotor 1 is arranged between the pair of stators 2. One stator 2 of the pair of stators 2 faces one surface of both axial end surfaces of the rotor 1, and another stator 2 of the pair of stators 2 faces another surface of both axial end surfaces of the rotor 1.

Figure 3:
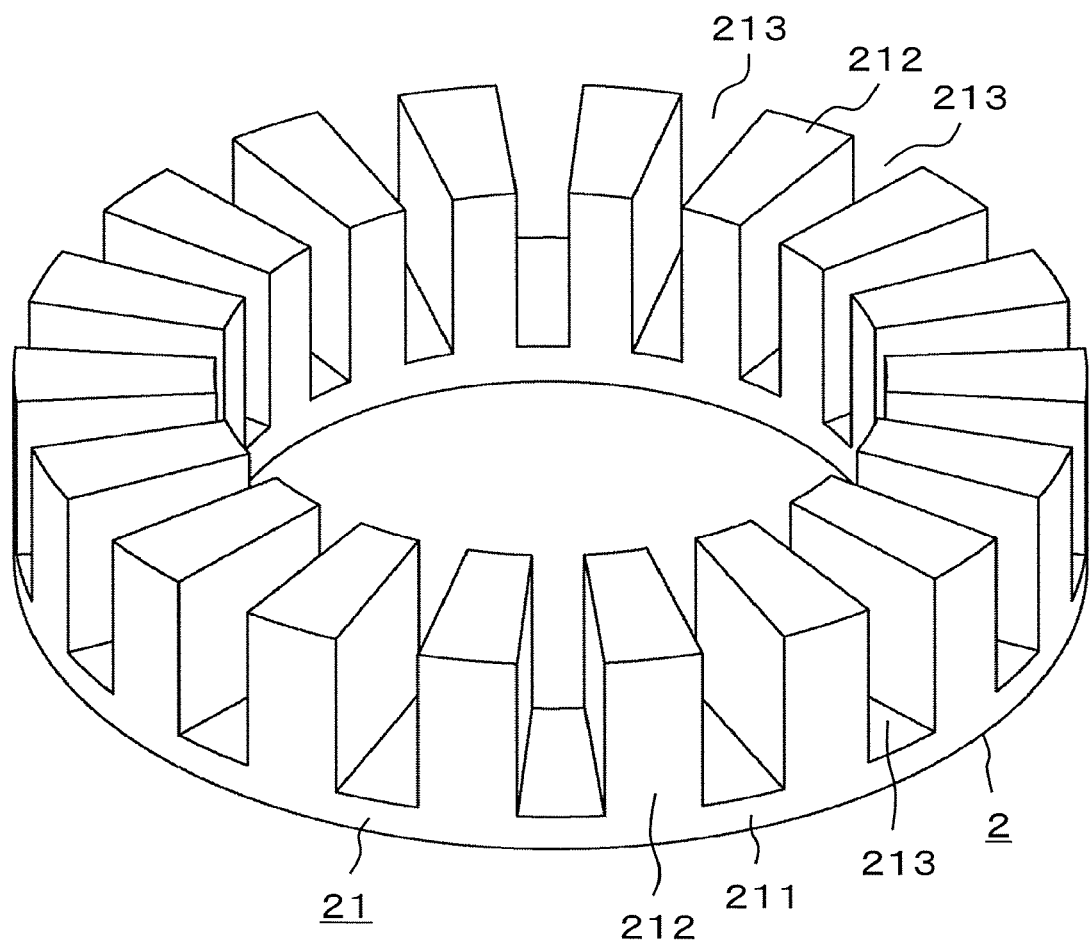
FIG. 3 is a perspective view for illustrating a stator of FIG. 1.

FIG. 3 is a perspective view for illustrating the stator 2 of FIG. 1. The stator 2 includes a stator iron core 21 and a stator winding (not shown). The stator winding is provided on the stator iron core 21. The stator winding is used as a torque generating drive winding.

The stator iron core 21 includes a core back 211 and a plurality of teeth 212. The core back 211 has a hollow-disc shape. The plurality of teeth 212 axially extend from one axial surface of the core back 211. A slot 213 is formed between the circumferentially adjacent teeth 212. The slot 213 is a space in which the stator winding is to be arranged. The stator iron core 21 is fixed to the housing 3 such that an axis of the stator iron core 21 and the axis of the shaft overlap with each other. The plurality of teeth 212 are arrayed circumferentially at equal intervals in a radially intermediate portion of the core back 211. The stator 2 is arranged such that distal ends of the teeth 212 face the rotor 1.

As seen in the axial direction, the teeth 212 each have a fan shape having a circumferential length increasing as approaching the radially outer side of the core back 211. A magnetic flux generated from the tooth 212 increases as approaching the radially outer side. Thus, the magnetomotive force of the permanent magnets 12 can be used effectively. The distal ends of the teeth 212 faces the rotor 1 with a certain gap formed with the rotor 1.

A conductor wire is wound around the tooth 212 without stepping across the slot 213 to construct the stator winding. That is, the stator winding is wound around the tooth 212 in a so-called concentrated wiring method. The stator windings of the respective phases are wound around separate teeth 212. End coils of the stator windings of the respective phases are set so as not to circumferentially overlap with one another. The stator windings are phase coils having multiple phases.

This axial gap rotating electrical machine has, for example, three phases and 2:3 sequences. The respective stator windings of a U-phase, a V-phase, and a W-phase wound in the stated order are supplied with currents having a phase difference of 120° from one another. With this action, a rotating magnetic field is generated in the stator 2.

As illustrated in FIG. 2, the housing 3 includes a bottom 31 and a cylindrical portion 32. The bottom 31 has a hollow-disc shape. The cylindrical portion 32 is fixed to a peripheral edge of the bottom 31 and axially extends from the bottom 31. The housing 3 is formed of a non-magnetic body. Another axial surface of the core back 211, which is a surface axially opposite to the one axial surface of the core back 211, is superposed on the bottom 31. The bottom 31 and the another axial surface of the core back 211 are in close contact with each other.

As indicated by an arrow A of FIG. 1, a magnetic flux generated from the north pole of the permanent magnet 12 enters the distal end of the tooth 212 of the stator iron core 21 facing the north pole of the permanent magnet 12, and further axially passes through the tooth 212 to enter the core back 211. The magnetic flux having entered the core back 211 circumferentially passes through the core back 211 and enters the base end of the tooth 212 circumferentially adjacent to the tooth 212 facing the north pole of the permanent magnet 12. The magnetic flux having entered the base end of the tooth 212 axially passes through the tooth 212 to enter the south pole of the permanent magnet 12. The magnetic flux generated from the permanent magnet 12 passes inside the stator iron core 21 in a three-dimensional manner. In this axial gap rotating electrical machine, the direction of flow of the magnetic flux is different from a radial-gap rotating electrical machine in which a magnetic flux radially and circumferentially passes within the same plane in a two-dimensional manner. However, a torque generation principle of the rotating electrical machine is the same as that of the radial-gap rotating electrical machine.

Figure 4:
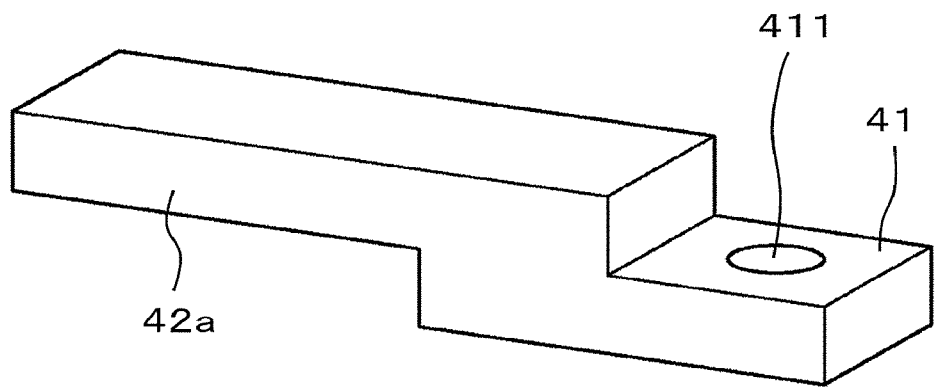
FIG. 4 is a perspective view for illustrating a fixing member configured to fix the stator of FIG. 2 to a housing.
Figure 5:
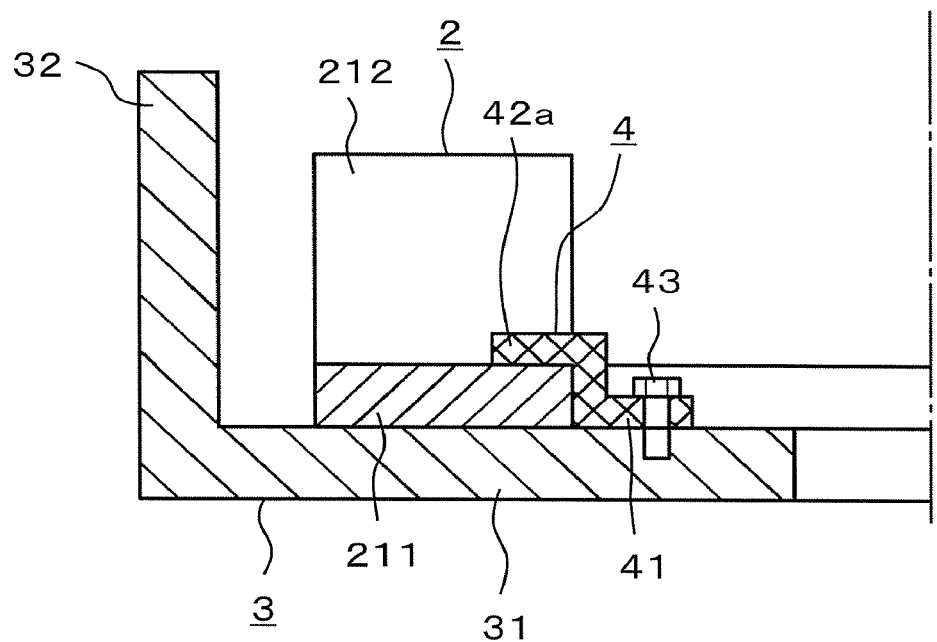
FIG. 5 is a longitudinal sectional view for illustrating a state in which the stator is fixed to the housing through use of the fixing member of FIG. 4.

FIG. 4 is a perspective view for illustrating a fixing member configured to fix the stator 2 of FIG. 2 to the housing 3, and FIG. 5 is a longitudinal sectional view for illustrating a state in which the stator 2 is fixed to the housing 3 through use of the fixing member of FIG. 4. A fixing member 4 includes a radially-inner-side fixing portion 41, a hook portion 42a, and a bolt 43. The radially-inner-side fixing portion 41 is fixed to the bottom 31 on the radially inner side of the core back 211. The hook portion 42a is fixed to the radially-inner-side fixing portion 41, extends radially outward from the radially-inner-side fixing portion 41, and is configured to press the radially inner portion of one axial surface of the core back 211 toward the bottom 31.

The bolt 43 is a fastening member configured to fix the radially-inner-side fixing portion 41 to the bottom 31. The radially-inner-side fixing portion 41 has a through hole 411 that axially passes therethrough. The bolt 43 is inserted into the through hole 411, and a distal end of the bolt 43 is inserted into a screw hole formed in the bottom 31. With this action, the radially-inner-side fixing portion 41 is fixed to the surface of the bottom 31, which faces the rotor 1, such that the hook portion 42a presses the radially inner portion of one axial surface of the core back 211 toward the bottom 31.

The stator 2 is fixed to the housing 3 by axial pressing force received from the fixing member 4. Therefore, the stator 2 is mechanically fixed to the housing 3 without use of, for example, an adhesive or mold resin. With this configuration, the stator 2 can be assembled to the housing 3 axially from the rotor 1 side. Further, this eliminates the need for a complicated step such as adhesive application or molding. In a high-temperature environment, the fixation strength may be degraded due to degradation in adhesion strength of the adhesive, or the fixation strength may be degraded due to thermal degradation of the mold resin. However, according to the present invention, the fixing member 4 mechanically fixes the stator 2 to the housing 3 so as to maintain the fixation strength of the stator 2 with respect to the housing 3 even in the high-temperature environment.

The heat generated in the stator winding due to copper loss is transferred to the housing 3 via the stator iron core 21. The housing 3 is cooled by natural cooling or forcible cooling such as water cooling. With the fixing member 4 being in surface contact with the stator iron core 21, the heat is also transferred from the stator iron core 21 to the fixing member 4. With the fixing member 4 being in surface contact with the housing 3, the heat is transferred also from the fixing member 4 to the housing 3. The fixing member 4 thus enhances the cooling effect for the axial gap rotating electrical machine.

As described above, the axial gap rotating electrical machine according to the first embodiment of the present invention includes: the rotor 1; the stator 2 which includes the stator iron core 21, the stator iron core 21 including: the core back 211 having the hollow-disc shape; and the plurality of teeth 212, which axially extending from one axial surface of the core back 211, and are arrayed circumferentially, the plurality of teeth 212 having the distal ends axially facing the rotor 1; the housing 3 having the bottom 31 on which another axial surface of the core back 211, which is the surface axially opposite to the one axial surface of the core back 211, is superposed; and the fixing member 4, which is fixed to the bottom 31 at a position radially shifted from the core back 211, and is configured to press the one axial surface of the core back 211 toward the bottom 31. Therefore, the fixation strength between the stator 2 and the housing 3 can be improved.

Further, the fixing member 4 includes the radially-inner-side fixing portion 41 that is fixed to the bottom 31 on the radially inner side of the core back 211, and the hook portion 42a that is fixed to the radially-inner-side fixing portion 41 and is configured to press the radially inner portion of one axial surface of the core back 211 toward the bottom 31. Therefore, increase in radial dimension of the housing 3 can be prevented.

The fixing member 4 may include a radially-outer-side fixing portion, a hook portion, and a bolt. The radially-outer-side fixing portion is fixed to the bottom 31 on the radially outer side of the core back 211. The hook portion is fixed to the radially-outer-side fixing portion, extends radially inward from the radially-outer-side fixing portion, and is configured to press the radially outer portion of one axial surface of the core back 211 toward the bottom 31. The bolt is a fastening member configured to fix the radially-outer-side fixing portion 44 to the bottom 31. Also in this case, a similar effect can be obtained.

Figure 6:
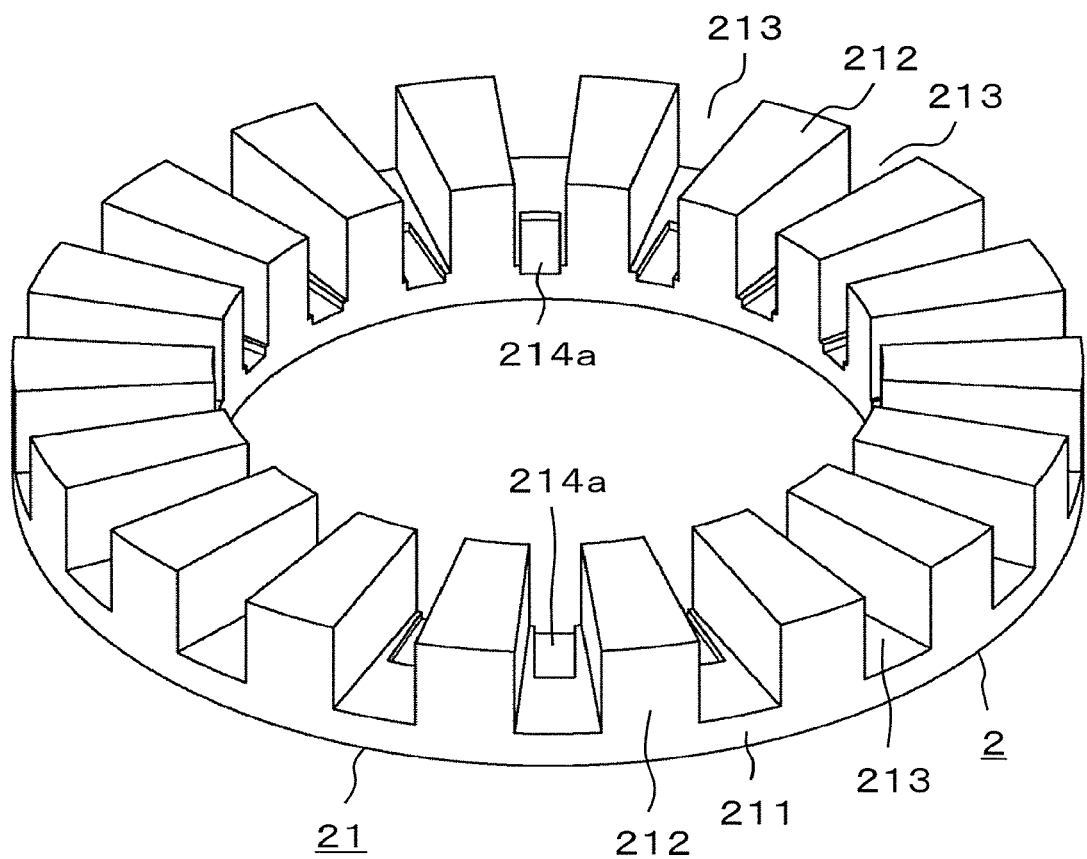
FIG. 6 is a perspective view for illustrating a modification example of a stator iron core of FIG. 3.
Figure 7:
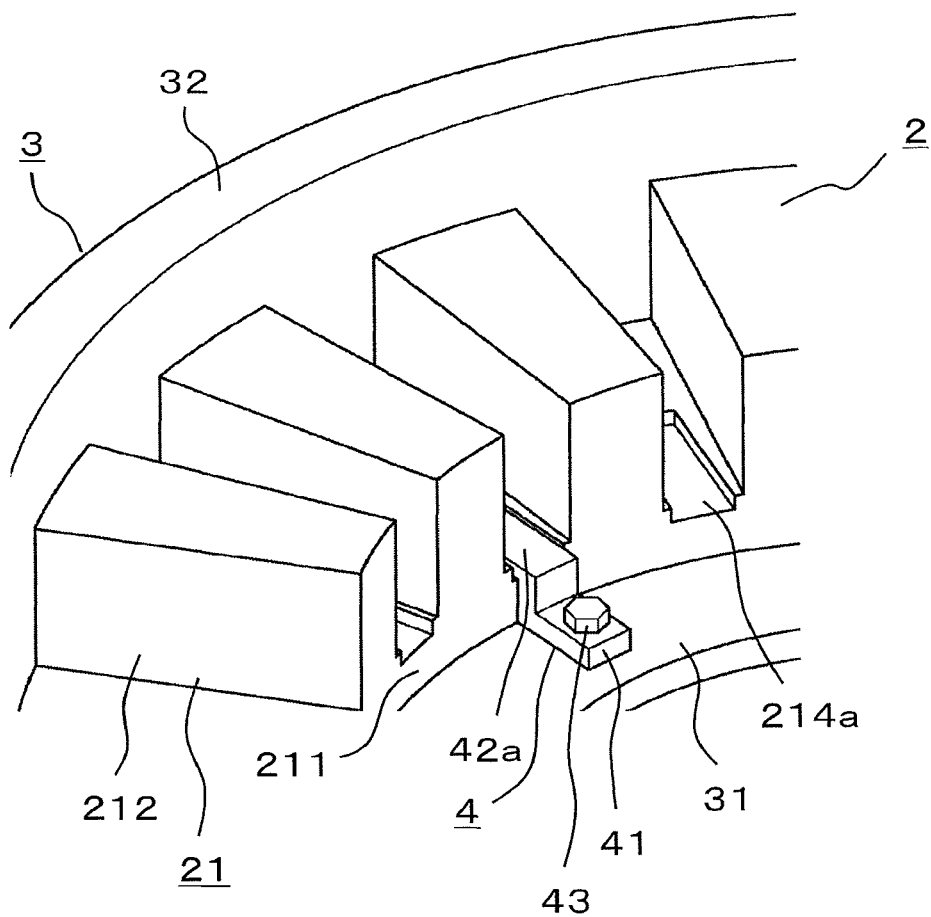
FIG. 7 is a perspective view for illustrating a state in which the stator iron core of FIG. 6 is fixed to the housing.
Figure 8:
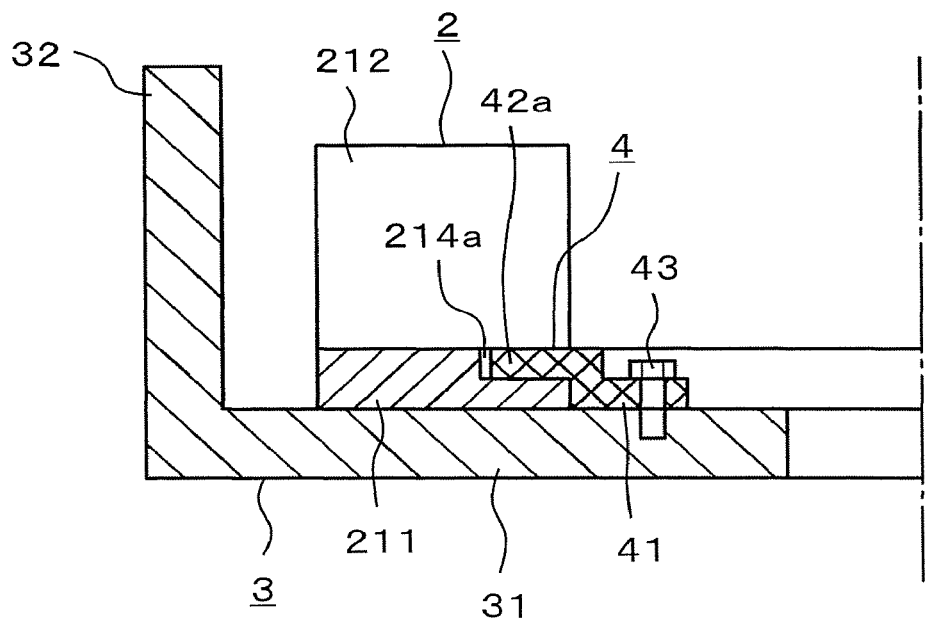
FIG. 8 is a longitudinal sectional view for illustrating a state in which the stator iron core of FIG. 6 is fixed to the housing.

FIG. 6 is a perspective view for illustrating a modification example of the stator iron core 21 of FIG. 3. FIG. 7 is a perspective view for illustrating a state in which the stator iron core 21 of FIG. 6 is fixed to the housing 3. FIG. 8 is a longitudinal sectional view for illustrating a state in which the stator iron core 21 of FIG. 6 is fixed to the housing 3. In the portion of the core back 211 which faces each slot 213, as well as the radially inner portion, a groove 214a may be formed so as to extend to the radially inner end. The groove 214a is arranged such that its opening faces the slot 213.

The hook portion 42a is inserted into the groove 214a. The hook portion 42a presses one axial surface in the groove 214a toward the bottom 31. With the hook portion 42a inserted in the groove 214a, the hook portion 42a is not arranged in the slot 213.

When the groove 214a is not formed in the core back 211, the hook portion 42a is arranged in the slot 213. With this configuration, a slot area being a region of the slot 213 in which the stator winding is arranged is reduced. When the groove 214a is formed in the core back 211, the hook portion 42a is not arranged in the slot 213. With this configuration, the slot area is not reduced, thereby enabling effective use of the space in which the stator winding is arranged.

The amount of the magnetic flux passing through the radially inner portion of the core back 211 is smaller as compared with the amount of the magnetic flux passing through the radially outer portion of the core back 211. Therefore, in the core back 211 having the groove 214a formed in the radially inner portion, the influence on a magnetic path that is reduced due to formation of the groove is smaller as compared with the core back having a groove formed in the radially outer portion.

Figure 9:
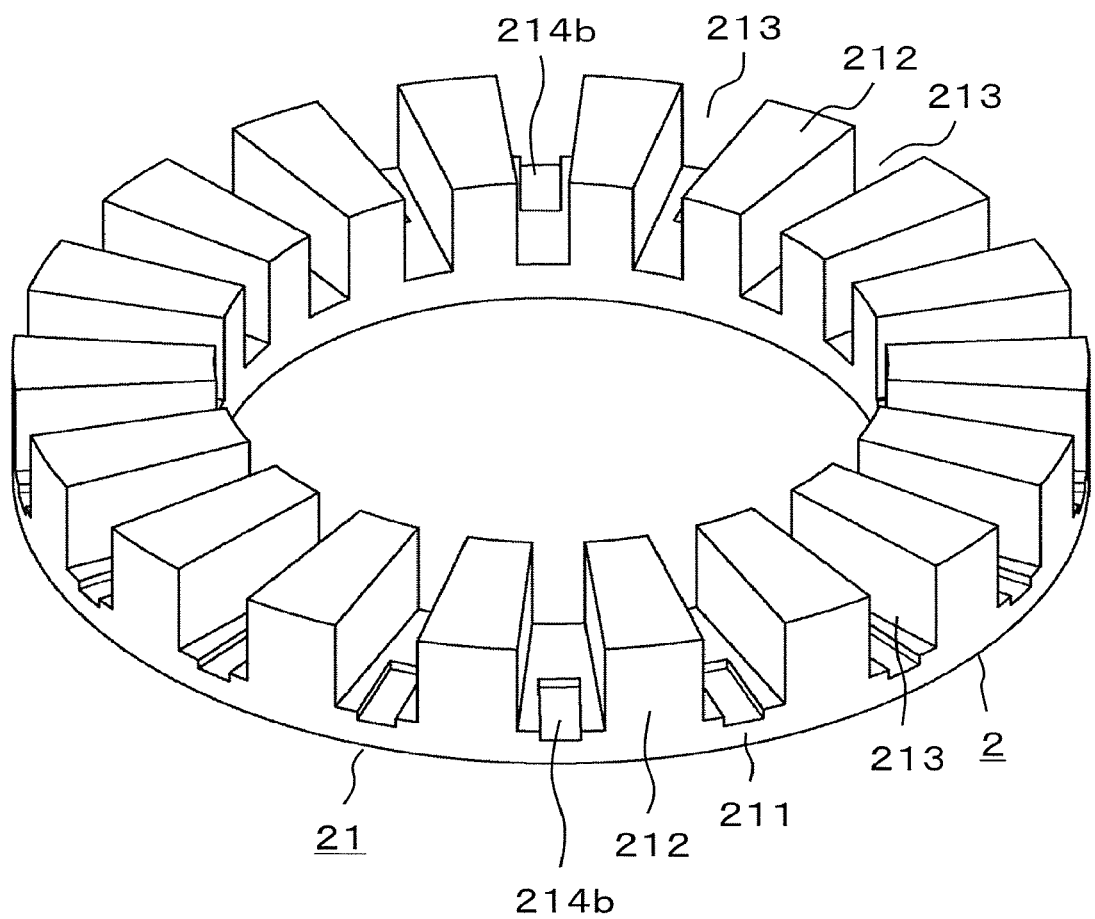
FIG. 9 is a perspective view for illustrating a modification example of the stator iron core of FIG. 3.
Figure 10:
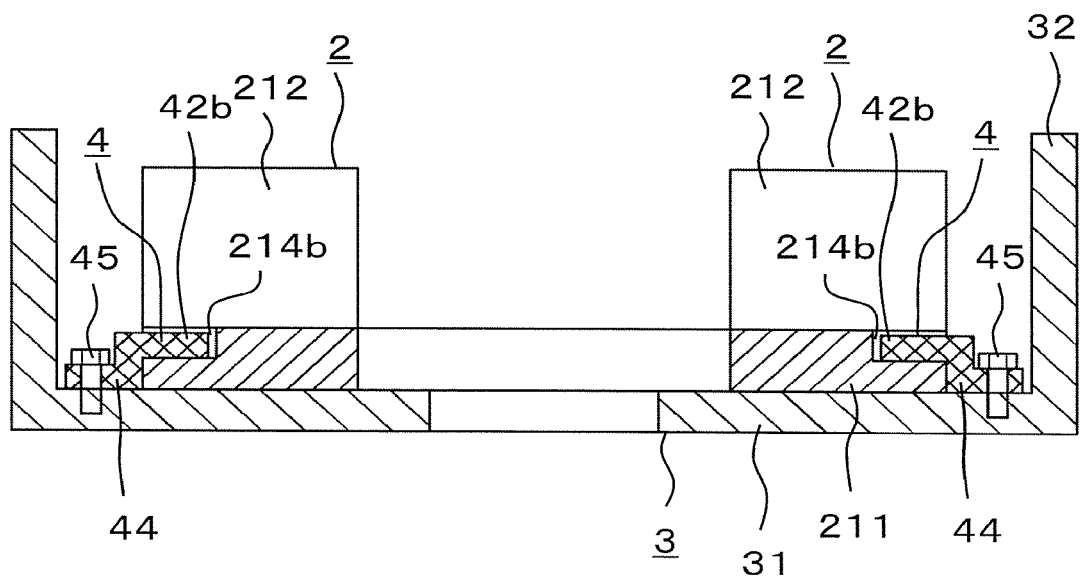
FIG. 10 is a longitudinal sectional view for illustrating a state in which the stator iron core of FIG. 9 is fixed to the housing.

FIG. 9 is a perspective view for illustrating a modification example of the stator iron core 21 of FIG. 3, and FIG. 10 is a longitudinal sectional view for illustrating a state in which the stator iron core 21 of FIG. 9 is fixed to the housing 3. In the portion of the core back 211 which faces each slot 213, as well as the radially outer portion, a groove 214b may be formed so as to extend to the radially outer end. The groove 214b is arranged such that its opening faces the slot 213.

In this case, the fixing member 4 includes the radially-outer-side fixing portion 44, a hook portion 42b, and a bolt 45. The radially-outer-side fixing portion 44 is fixed to the bottom 31 on the radially outer side of the core back 211. The hook portion 42b is fixed to the radially-outer-side fixing portion 44, extends radially inward from the radially-outer-side fixing portion 44, and is configured to press the radially outer portion of one axial surface of the core back 211 toward the bottom 31. The bolt 45 is a fastening member configured to fix the radially-outer-side fixing portion 44 to the bottom 31.

The hook portion 42b is inserted into the groove 214b. The hook portion 42b presses one axial surface in the groove 214b toward the bottom 31. With the hook portion 42b inserted in the groove 214b, the hook portion 42b is not arranged in the slot 213.

In the axial gap rotating electrical machine, the amount of the magnetic flux passing through the radially outer portion of the core back 211 is larger as compared with the amount of the magnetic flux passing through the radially inner portion of the core back 211. Thus, the axial electromagnetic force to act is larger in the radially outer portion of the core back 211 as compared with the radially inner portion of the core back 211. When the groove 214b is formed in the radially outer portion of the core back 211, the cross-sectional area of the magnetic path decreases and the magnetic resistance increases as compared with the case of forming the groove 214a in the radially inner portion of the core back 211, and there may be a risk of causing degradation of motor characteristics. However, it is possible to further improve the fixation strength of the stator iron core 21 to the housing 3 by pressing the portion of the core back 211 which has large electromagnetic force toward the bottom 31.

Figure 11:
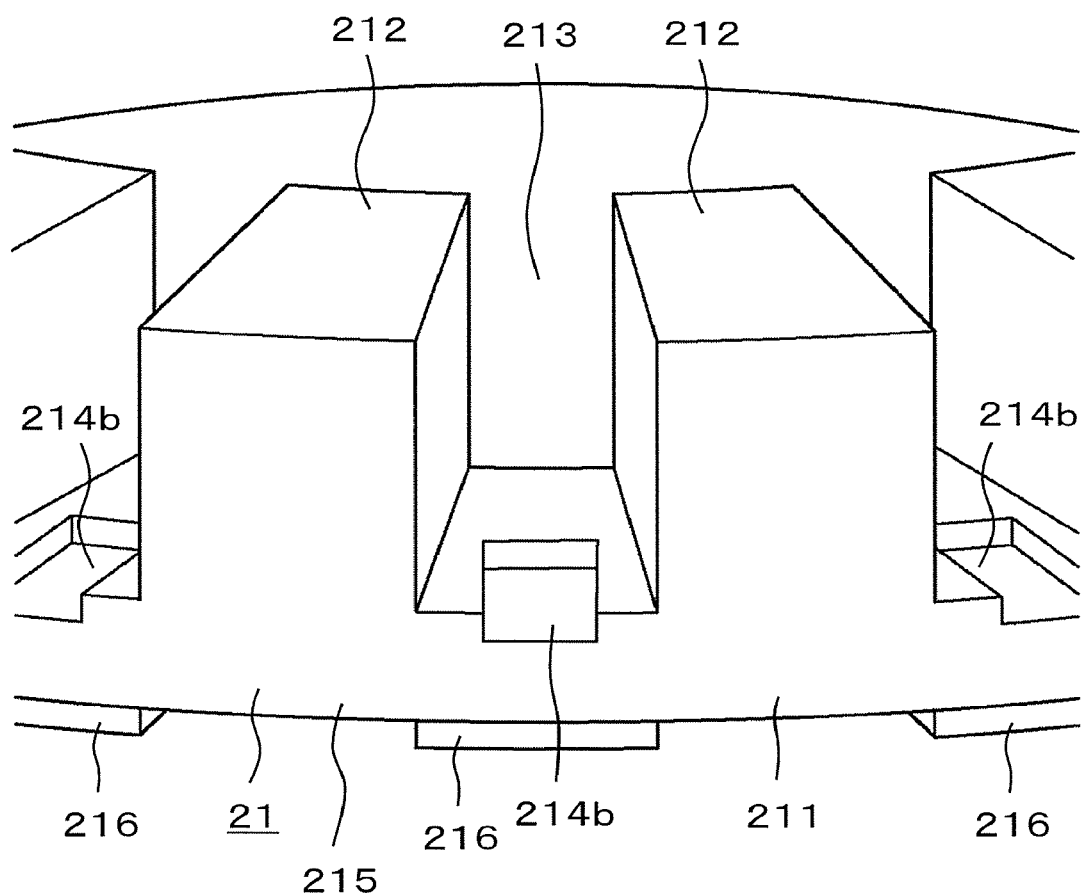
FIG. 11 is a perspective view for illustrating a modification example of the stator iron core of FIG. 9.

FIG. 11 is a perspective view for illustrating a modification example of the stator iron core 21 of FIG. 9. The core back 211 includes a core back body 215 and a thick portion 216. The core back body 215 has the groove 214b. The thick portion 216 protrudes from the core back body 215 in the direction opposite to the direction in which the tooth 212 extends from the core back body 215. The thick portion 216 is arranged so as to overlap with the groove 214b as seen in the axial direction.

In the axial gap rotating electrical machine, the amount of the magnetic flux passing through the radially outer portion of the core back 211 is larger than the amount of the magnetic flux passing through the radially inner portion of the core back 211. Thus, the thick portion 216 protruding in the direction opposite to the direction in which the tooth 212 extends is arranged in the radially outer portion of the core back 211, thereby being capable of sufficiently ensuring a portion of the magnetic path which has a large magnetic flux amount and obtaining favorable magnetic characteristics.

When the stator 2 is arranged on each of both axial sides of the rotor 1, the phase of the stator iron core 21 of each stator 2 affects characteristics of the rotating electrical machine. The use of the thick portion 216 for circumferential positioning can improve the accuracy in assembly. The thick portion 216 can be arranged not only in the radially outer portion of the core back 211 but in the radially inner portion of the core back 211 to obtain a similar effect.

Figure 12:
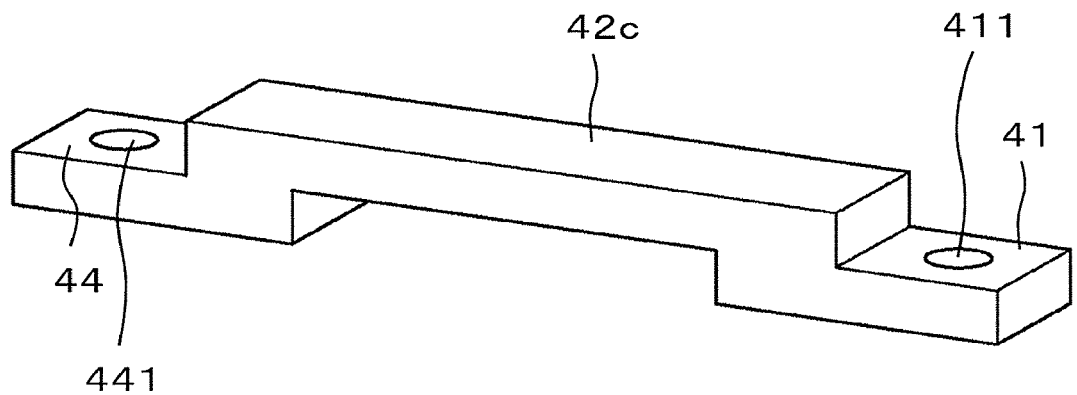
FIG. 12 is a perspective view for illustrating a modification example of the fixing member of FIG. 4.
Figure 13:
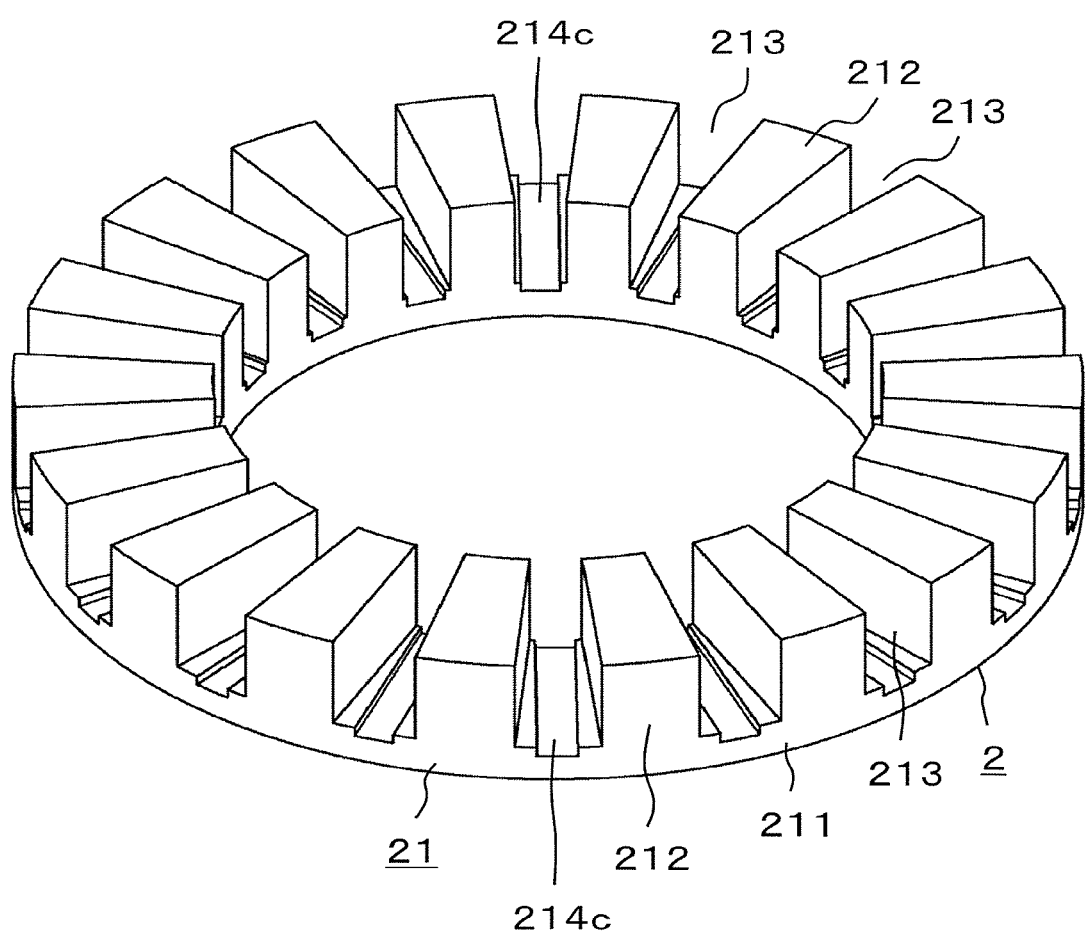
FIG. 13 is a perspective view for illustrating a stator that is to be fixed to a housing through use of the fixing member of FIG. 12.

FIG. 12 is a perspective view for illustrating a modification example of the fixing member 4 of FIG. 4, and FIG. 13 is a perspective view for illustrating the stator 2 that is to be fixed to the housing 3 through use of the fixing member 4 of FIG. 12. In the portion of the core back 211 which faces each slot 213, a groove 214c may be formed so as to extend entirely in a radial part. The groove 214c is arranged such that its opening faces the slot 213.

In this case, the fixing member 4 includes the radially-inner-side fixing portion 41, the radially-outer-side fixing portion 44, the pressing portion 42c, and bolts (not shown). The radially-inner-side fixing portion 41 is fixed to the bottom on the radially inner side of the core back 211. The radially-outer-side fixing portion 44 is fixed to the bottom 31 on the radially outer side of the core back 211. The pressing portion 42c is fixed to the radially-inner-side fixing portion 41 and the radially-outer-side fixing portion 44, and is inserted into the groove 214c. The bolts are fastening members configured to fix the radially-inner-side fixing portion 41 and the radially-outer-side fixing portion 44 to the bottom 31. The radially-inner-side fixing portion 41 has a through hole 411 into which the bolt is to be inserted. The radially-outer-side fixing portion 44 has a through hole 441 into which the bolt is to be inserted. The radially-inner-side fixing portion 41 and the radially-outer-side fixing portion 44 are in surface contact with the bottom 31, thereby being capable of further enhancing the cooling effect for the axial gap rotating electrical machine.

Figure 14:
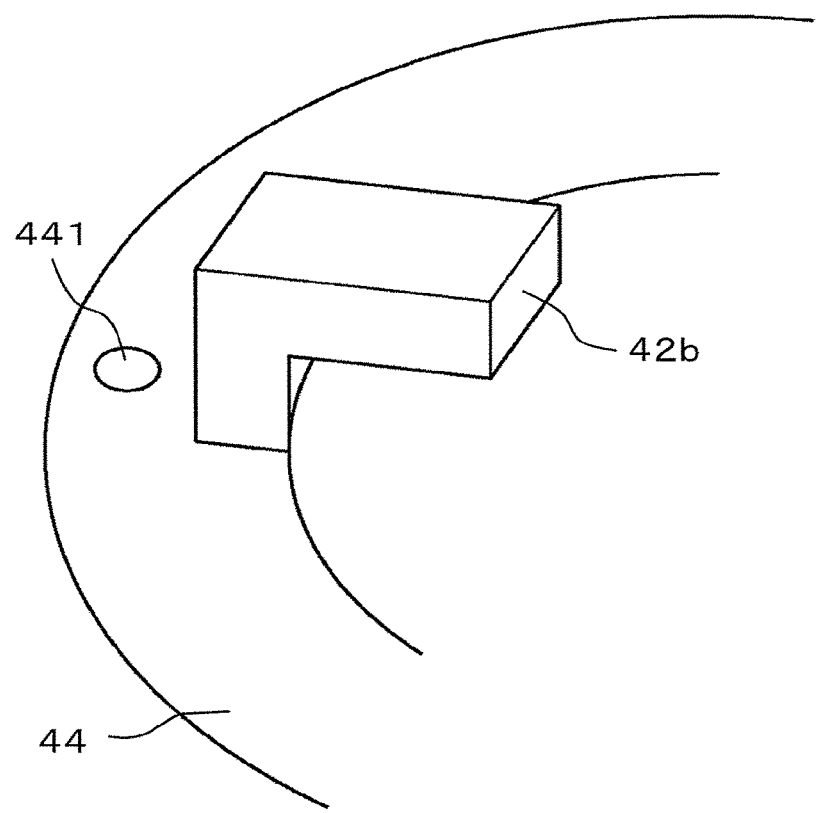
FIG. 14 is a perspective view for illustrating a modification example of the fixing member of FIG. 10.

FIG. 14 is a perspective view for illustrating a modification example of the fixing member 4 of FIG. 10. The radially-outer-side fixing portion 44 may be formed so as to extend along the outer circumferential surface of the core back 211. In FIG. 14, the radially-outer-side fixing portion 44 has the hollow-disc shape. The radially-outer-side fixing portion 44 extends along the outer circumferential surface of the core back 211, thereby increasing the contact area between the radially-outer-side fixing portion 44 and the bottom 31. With this configuration, the cooling effect for the axial gap rotating electrical machine can further be enhanced. Although not illustrated, the radially-inner-side fixing portion 41 may be formed so as to extend along the outer circumferential surface of the core back 211. In this case, the radially-inner-side fixing portion 41 may have a hollow-disc shape.

In the above-mentioned first embodiment, the stator iron core 21 may be formed of radially laminated electromagnetic steel plates, may be formed by molding a magnetic green compact material into the shape of the stator iron core, or may be formed of a massive magnetic body.

Second Embodiment

Figure 15:
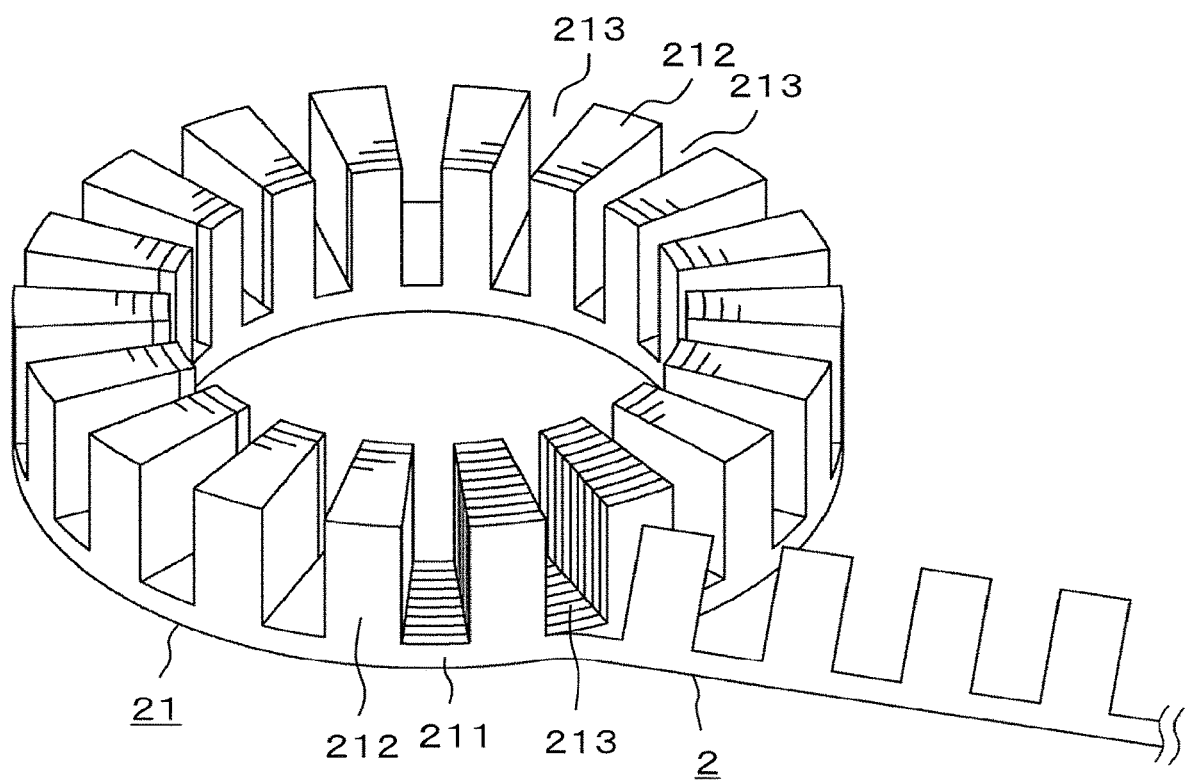
FIG. 15 is a perspective view for illustrating a stator iron core of an axial gap rotating electrical machine according to a second embodiment of the present invention.

FIG. 15 is a perspective view for illustrating a stator iron core of an axial gap rotating electrical machine according to a second embodiment of the present invention. The stator iron core 21 is a wound iron core formed by concentrically winding tape-like electromagnetic steel plates. Electromagnetic steel plates cut in a sheet shape may be laminated radially. In any one of the cases, the stator iron core 21 is formed of the radially laminated electromagnetic steel plates.

Figure 16:
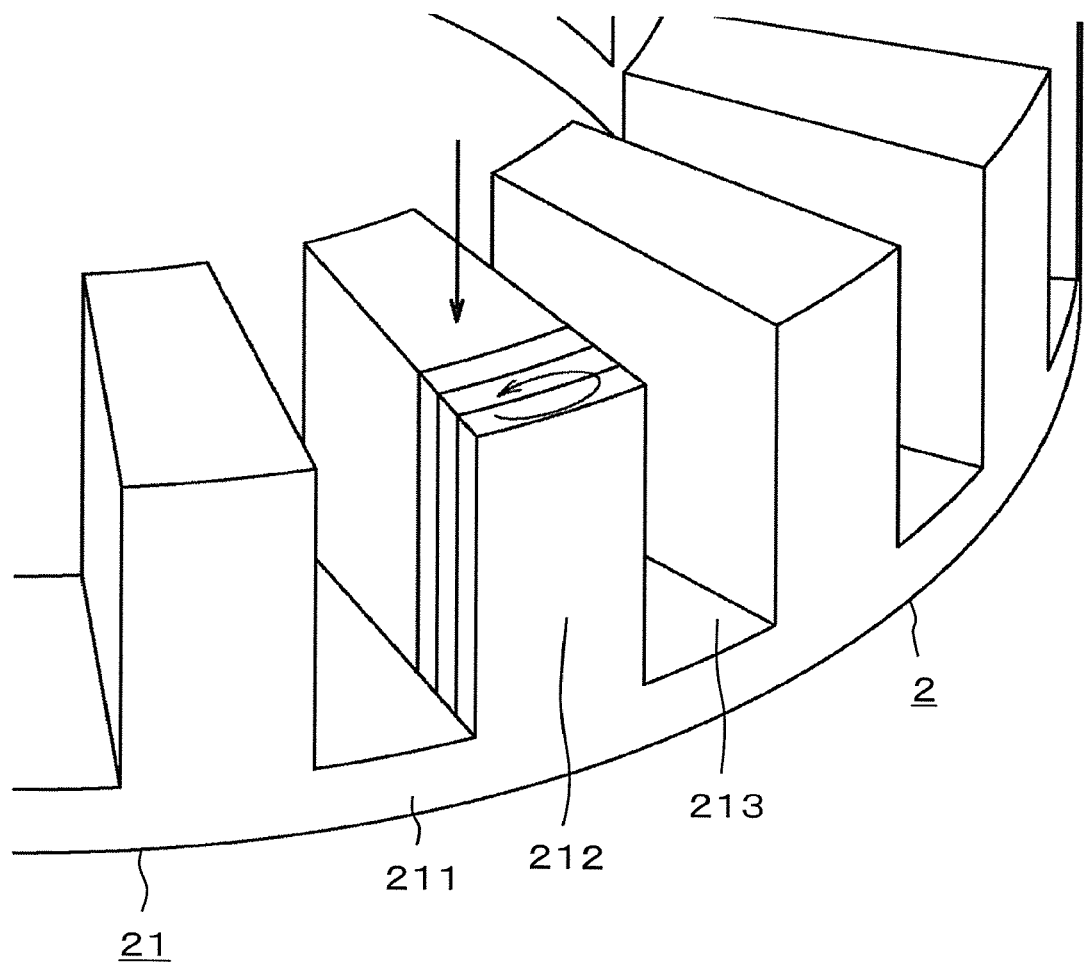
FIG. 16 is a perspective view for illustrating an eddy current that is generated in the stator iron core of FIG. 15.
Figure 17:
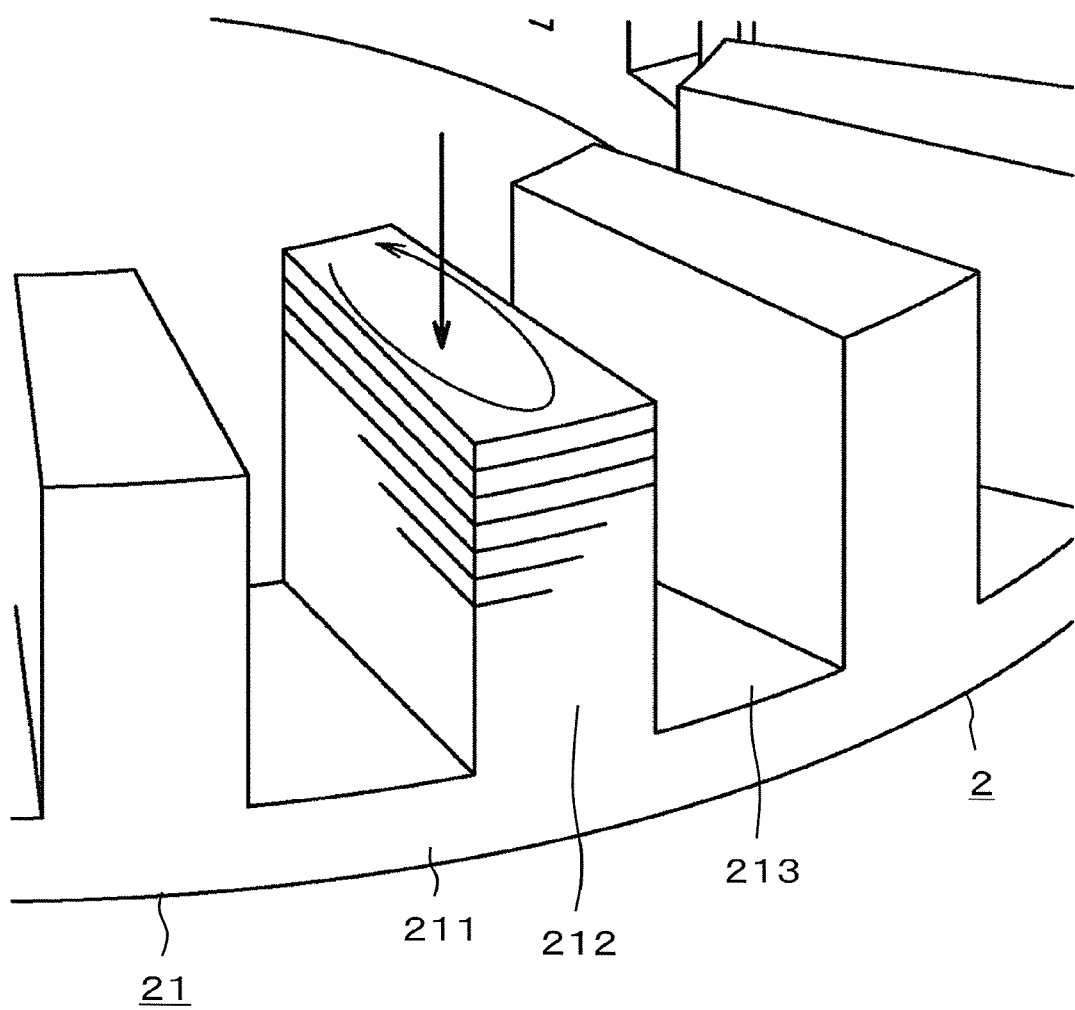
FIG. 17 is a perspective view for illustrating an eddy current that is generated in a stator iron core formed of axially laminated electromagnetic steel plates.

FIG. 16 is a perspective view for illustrating an eddy current that is generated in the stator iron core 21 of FIG. 15, and FIG. 17 is a perspective view for illustrating an eddy current that is generated in the stator iron core 21 formed of the axially laminated electromagnetic steel plates. An axially parallel magnetic flux passes through the tooth 212 axially protruding from the disc-like core back 211. In the case of the stator iron core 21 formed of the axially laminated electromagnetic steel plates, the magnetic flux is oriented in a direction perpendicular to the extending direction of the electromagnetic steel plates. Thus, the eddy current flows in the electromagnetic steel plates, with the result that loss occurs. Meanwhile, in the case of the stator iron core 21 formed of the radially laminated electromagnetic steel plates, an insulating layer is arranged on each widthwise end surface of the electromagnetic steel plates. Thus, an area for the flow of the eddy current becomes smaller, thereby reducing the generation of the eddy current. As a result, the loss can be reduced.

In the case of the stator iron core 21 formed of the axially laminated electromagnetic steel plates, the laminated electromagnetic steel plates can be mechanically joined to one another by caulking or the like. In the case of the wound iron core formed by concentrically winding tape-like electromagnetic steel plates, that is, the stator iron core 21 formed of the radially laminated electromagnetic steel plates, it is difficult to mechanically join the electromagnetic steel plates by caulking or the like. In the iron core formed by radially laminating the electromagnetic steel plates, after the tape-like electromagnetic steel plates having the slot 213 punched out therefrom are wound concentrically, the winding end portion is temporarily joined by welding or the like, and an adhesive is impregnated into the layers to fix the electromagnetic steel plates to one another.

The adhesive has high adhesive strength against radially peeling force, but has lower adhesive strength against axial shearing force as compared with the radially peeling force. In the axial gap rotating electrical machine using the stator iron core 21 formed by radially laminating the electromagnetic steel plates, it is necessary to take countermeasures against axial attractive force that acts on the stator iron core 21.

Each tape-like electromagnetic steel plate may be cut circumferentially in a circuit unit and laminated radially.

Although not illustrated, the axial gap rotating electrical machine includes the fixing member 4 illustrated in FIG. 4 as in the first embodiment. Other configurations are similar to those in the first embodiment.

As described above, the axial gap rotating electrical machine according to the second embodiment of the present invention includes the fixing member 4 that is fixed to the bottom 31 at a position radially shifted from the core back 211 and presses one axial surface of the core back 211 toward the bottom 31, and the stator iron core 21 is formed of the radially laminated electromagnetic steel plates, thereby being capable of reducing the eddy current generated in the stator iron core 21 and reducing the action by the axial shearing force on the stator iron core 21.

The fixing member 4 may include a radially-outer-side fixing portion that is fixed to the bottom 31 on the radially outer side of the core back 211, a hook portion that is fixed to an radially-outer-side fixing portion, extends radially inward from the radially-outer-side fixing portion, and presses the radially outer portion of one axial surface of the core back 211 toward the bottom 31, and a bolt that is a fastening member configured to fix an radially-outer-side fixing portion 44 to the bottom 31. Also in this case, a similar effect can be obtained.

Further, as illustrated in FIG. 6, in the portion of the core back 211 which faces each slot 213, as well as the radially inner portion, the groove 214a may be formed so as to extend to the radially inner end.

Moreover, as illustrated in FIG. 9, in the portion of the core back 211 which faces each slot 213, as well as the radially outer portion, the groove 214b may be formed so as to extend to the radially outer end. In this case, as illustrated in FIG. 10, the fixing member 4 includes the radially-outer-side fixing portion 44 fixed to the bottom 31 on the radially outer side of the core back 211, the hook portion 42b that is fixed to the radially-outer-side fixing portion 44, extends radially inward from the radially-outer-side fixing portion 44, and presses the radially outer portion of one axial surface of the core back 211 toward the bottom 31, and the bolt 45 that is a fastening member configured to fix the radially-outer-side fixing portion 44 to the bottom 31.

In the axial gap rotating electrical machine, the magnetomotive force generated in the radially outer portion of the core back 211 is larger than the magnetomotive force generated in the radially inner portion of the core back 211. Thus, with the fixing member 4 pressing the radially outer portion of the core back 211 toward the bottom 31, the area for placement of the fixing member 4 is reduced while the axial holding force of the core back 211 by the fixing member 4 is ensured, and the radially-inner-side of the stator iron core 21 is used for placement of the bearings or the like, thereby enabling reduction in volume of the rotating electrical machine.

When the groove 214b is formed in the portion of the core back 211 which faces each slot 213, as well as the radially outer portion, as illustrated in FIG. 11, the core back 211 may include the core back body 215 having the groove 214b, and the thick portion 216 protruding from the core back body 215 in the direction opposite to the direction in which the tooth 212 extends from the core back body 215. In this case, the thick portion 216 is arranged so as to overlap with the groove 214b as seen in the axial direction. The thick portion 216 may be arranged not only in the radially outer portion of the core back 211 but also in the radially inner portion of the core back 211.

Further, as illustrated in FIG. 14, the fixing member 4 may include the radially-outer-side fixing portion 44, and the hook portion 42b that is fixed to the radially-outer-side fixing portion 44, extends radially inward from the radially-outer-side fixing portion 44, and presses the radially outer portion of one axial surface of the core back 211 toward the bottom 31, and the radially-outer-side fixing portion 44 may be formed so as to extend along the outer circumferential surface of the core back 211. The radially-outer-side fixing portion 44 extends along the outer circumferential surface of the core back 211, thereby increasing the contact area between the radially-outer-side fixing portion 44 and the bottom 31. With this configuration, the cooling effect for the axial gap rotating electrical machine can further be enhanced. Although not illustrated, the fixing member 4 may include the radially-inner-side fixing portion 41, and the radially-inner-side fixing portion 41 may be formed so as to extend along the inner circumferential surface of the core back 211.

Third Embodiment

Figure 18:
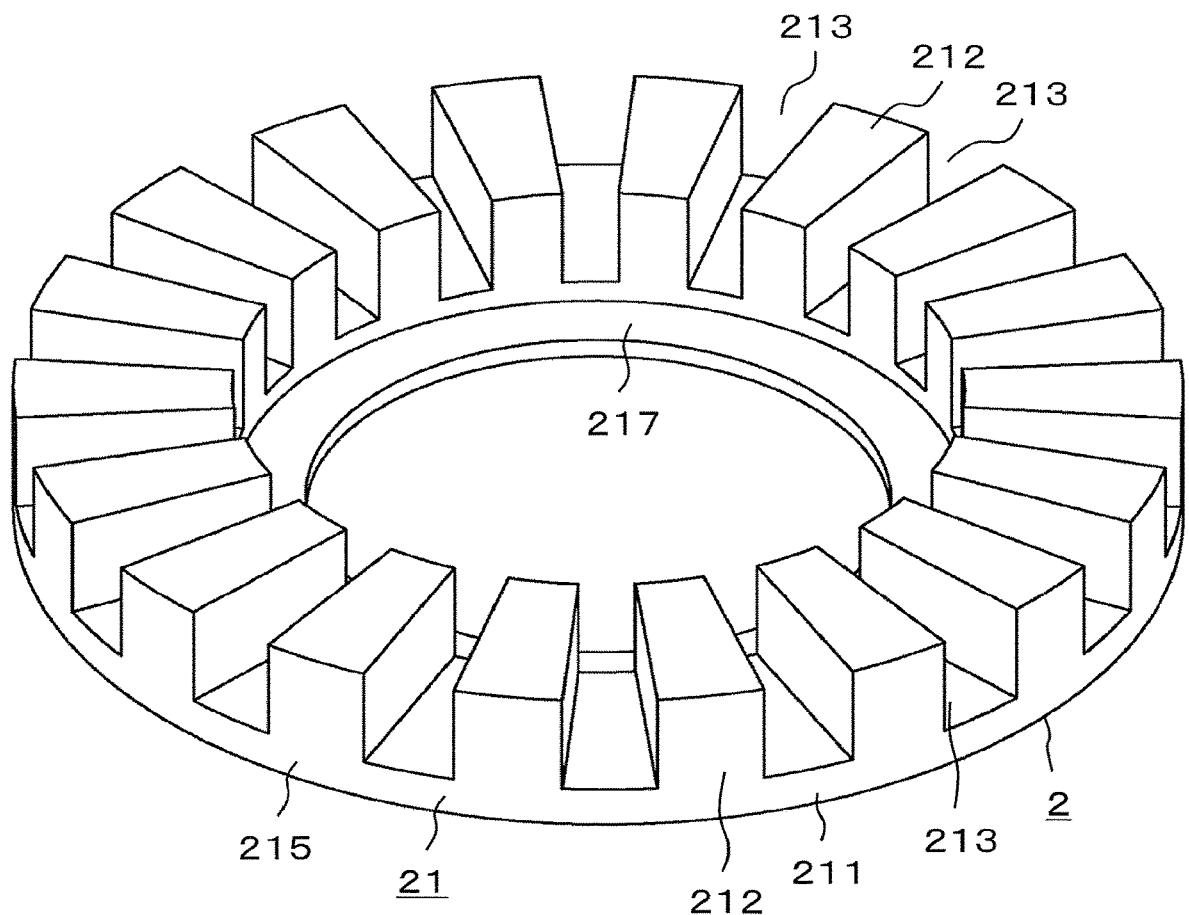
FIG. 18 is a perspective view for illustrating a stator iron core of an axial gap rotating electrical machine according to a third embodiment of the present invention.

FIG. 18 is a perspective view for illustrating a stator iron core of an axial gap rotating electrical machine according to a third embodiment of the present invention. In the axial gap rotating electrical machine, the torque generating surface is the counter surface of the rotor 1 and the stator 2, and hence the axial gap rotating electrical machine is advantageous in having a so-called flat structure with a large radial dimension and a small axial dimension. When the fixing member 4 is arranged in the slot 213 to generate axial pressing force as in the first embodiment and the second embodiment, the axial dimension of the stator iron core 21 may increase so as to ensure the space for placement of the stator winding or to ensure the area of the magnetic path in the core back 211.

In this axial gap rotating electrical machine, the stator iron core 21 includes the core back 211 having the hollow-disc shape and a plurality of teeth 212 axially extending from one axial surface of the core back 211. The core back 211 includes the core back body 215 having the teeth 212, and a radially-inner-side overhanging portion 217 extending radially inward from the core back body 215.

Similarly to the first embodiment, as illustrated in FIG. 4, the fixing member 4 includes the radially-inner-side fixing portion 41 that is fixed to the bottom 31 on the radially inner side of the radially-inner-side overhanging portion 217, the hook portion 42a that is fixed to the radially-inner-side fixing portion and presses one axial surface in the radially-inner-side overhanging portion 217 toward the bottom 31, and the bolt (not shown) configured to fix the radially-inner-side fixing portion 41 to the bottom 31. The radially-inner-side fixing portion 41 has the through hole 411 into which the bolt is to be inserted. Other configurations are similar to those in the first embodiment or the second embodiment.

As described above, according to the axial gap rotating electrical machine of the third embodiment of the present invention, the core back 211 includes the core back body 215 having the teeth 212, and the radially-inner-side overhanging portion 217 extending radially inward from the core back body 215, thereby increasing the cross-sectional area of the magnetic path in the core back 211 and decreasing the magnetic resistance. With this configuration, the amount of the magnetic flux passing through the magnetic circuit is increased, thereby enabling improvement in characteristics of the rotating electrical machine. The fixing member 4 presses the one axial surface in the radially-inner-side overhanging portion 217 toward the bottom 31, so that the stator iron core 21 can be assembled in the housing 3 even after placement of the stator winding on the stator iron core 21.

Figure 19:
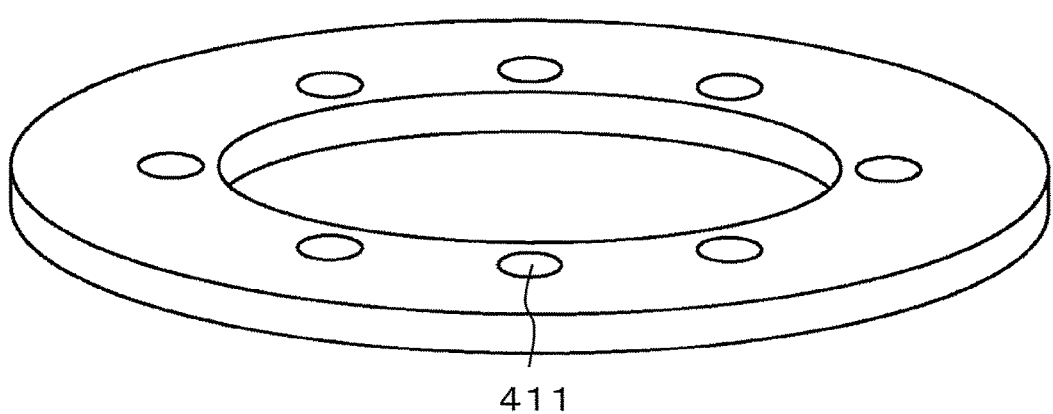
FIG. 19 is a perspective view for illustrating a modification example of a fixing member configured to fix the stator of FIG. 18 to the housing.
Figure 20:
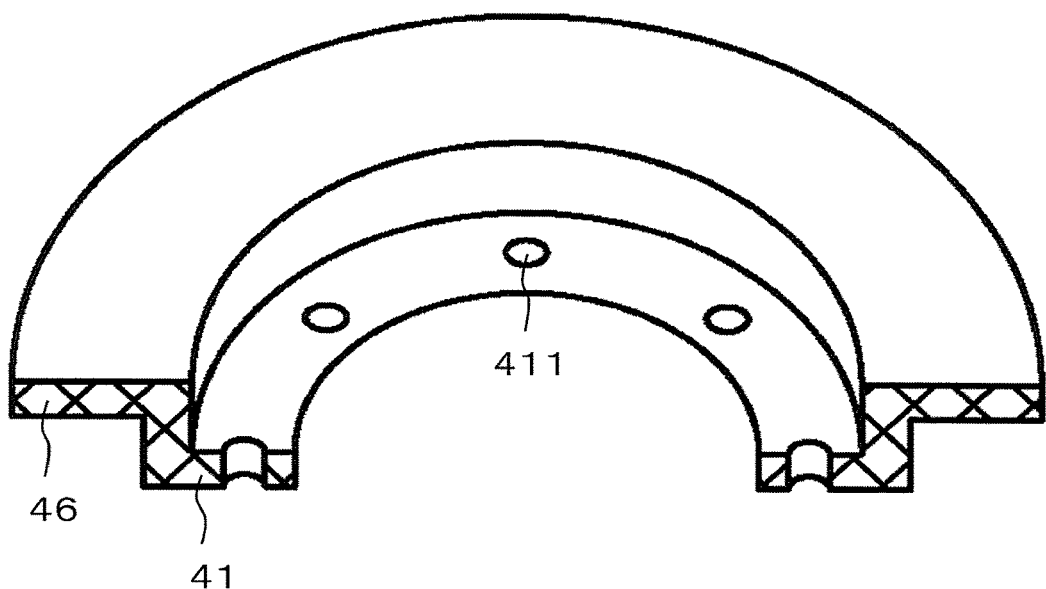
FIG. 20 is a longitudinal sectional view for illustrating the fixing member of FIG. 19.

FIG. 19 is a perspective view for illustrating a modification example of the fixing member configured to fix the stator 2 of FIG. 18 to the housing, and FIG. 20 is a longitudinal sectional view for illustrating the fixing member of FIG. 19. The fixing member 4 may have the hollow-disc shape. Specifically, the fixing member 4 may include the radially-inner-side fixing portion 41 that is fixed to the bottom 31 on the radially inner side of the radially-inner-side overhanging portion 217, a pressing portion 46 that is fixed to the radially-inner-side fixing portion 41 and presses one axial surface in the radially-inner-side overhanging portion 217 toward the bottom 31, and the bolt (not shown) configured to fix the radially-inner-side fixing portion 41 to the bottom 31. Although the pressing portion 46 has an annular shape in FIG. 20, it may be a hook portion extending radially outward from the radially-inner-side fixing portion 41.

Figure 21:
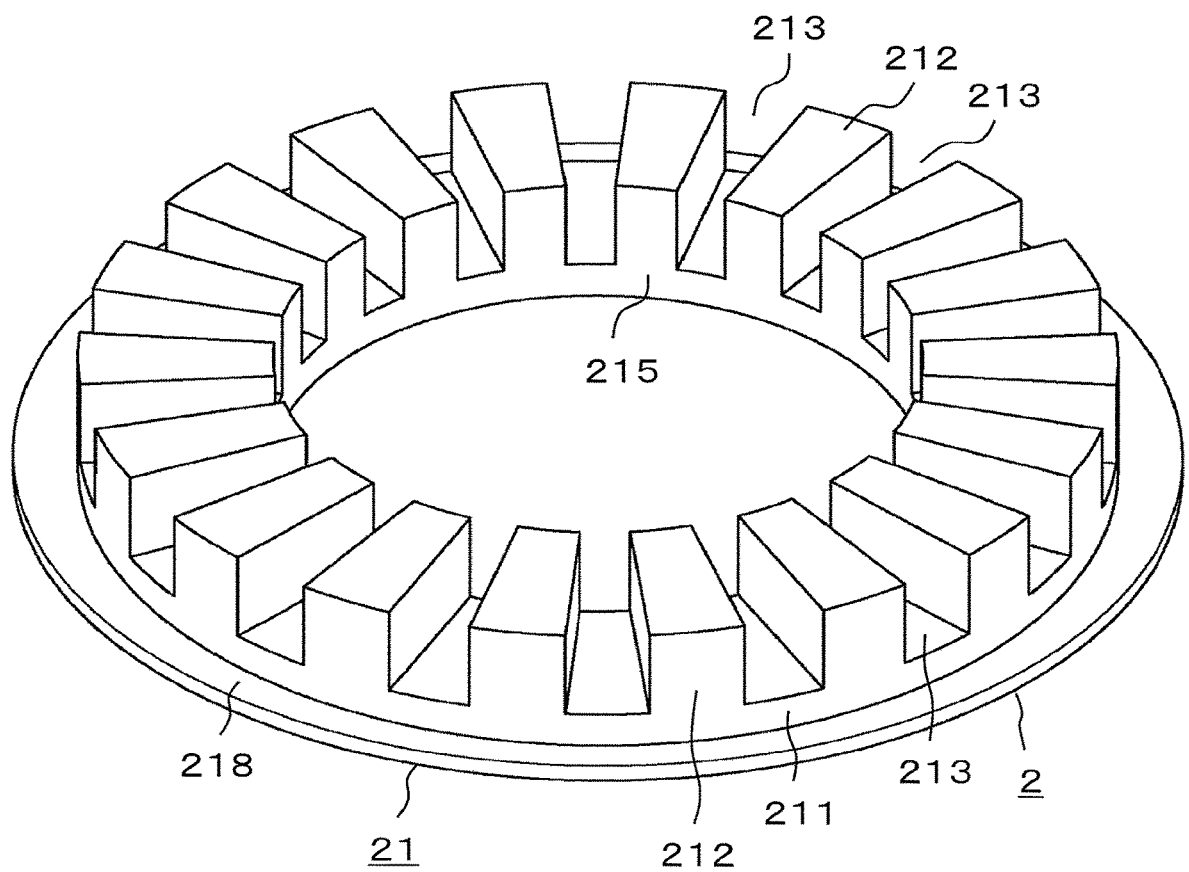
FIG. 21 is a perspective view for illustrating a modification example of the stator iron core of FIG. 18.
Figure 22:
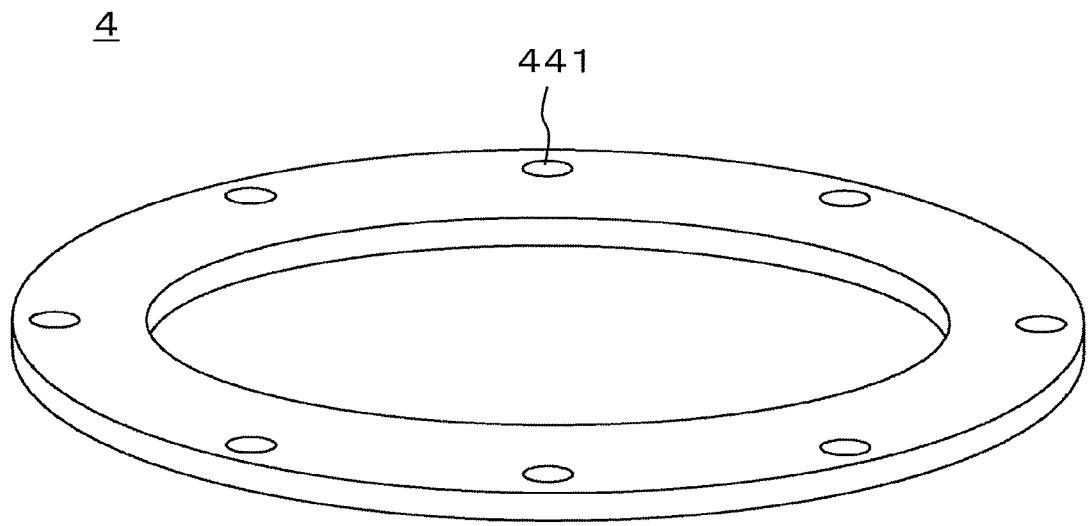
FIG. 22 is a perspective view for illustrating a fixing member configured to fix the stator of FIG. 21 to the housing.
Figure 23:
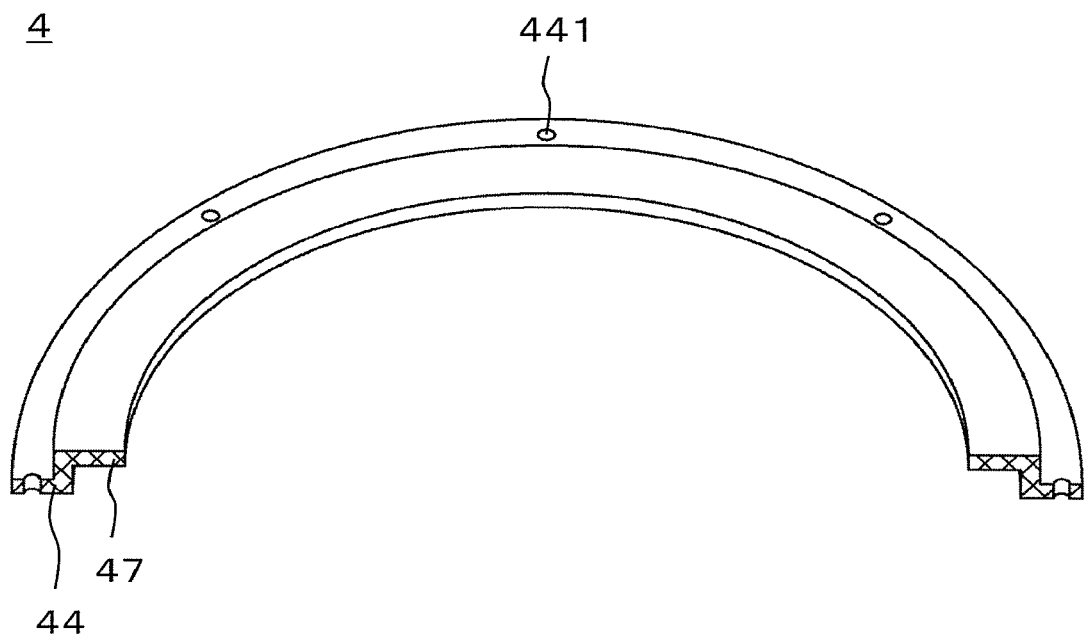
FIG. 23 is a longitudinal sectional view for illustrating the fixing member of FIG. 22.

FIG. 21 is a perspective view for illustrating a modification example of the stator iron core 21 of FIG. 18. FIG. 22 is a perspective view for illustrating a fixing member configured to fix the stator 2 of FIG. 21 to the housing. FIG. 23 is a longitudinal sectional view for illustrating the fixing member of FIG. 22. The core back 211 may include the core back body 215 having the teeth 212, and a radially-outer-side overhanging portion 218 extending radially outward from the core back body 215. In this case, the fixing member 4 may include the radially-outer-side fixing portion 44 that is fixed to the bottom 31 on the radially outside of the radially-outer-side overhanging portion 218 and a pressing portion 47 that is fixed to the radially-outer-side fixing portion 44 and presses one axial surface in the radially-outer-side overhanging portion 218 toward the bottom 31. Although the pressing portion 47 has an annular shape in FIG. 23, it may be a hook portion extending radially inward from the radially-outer-side fixing portion 44.

Figure 24:
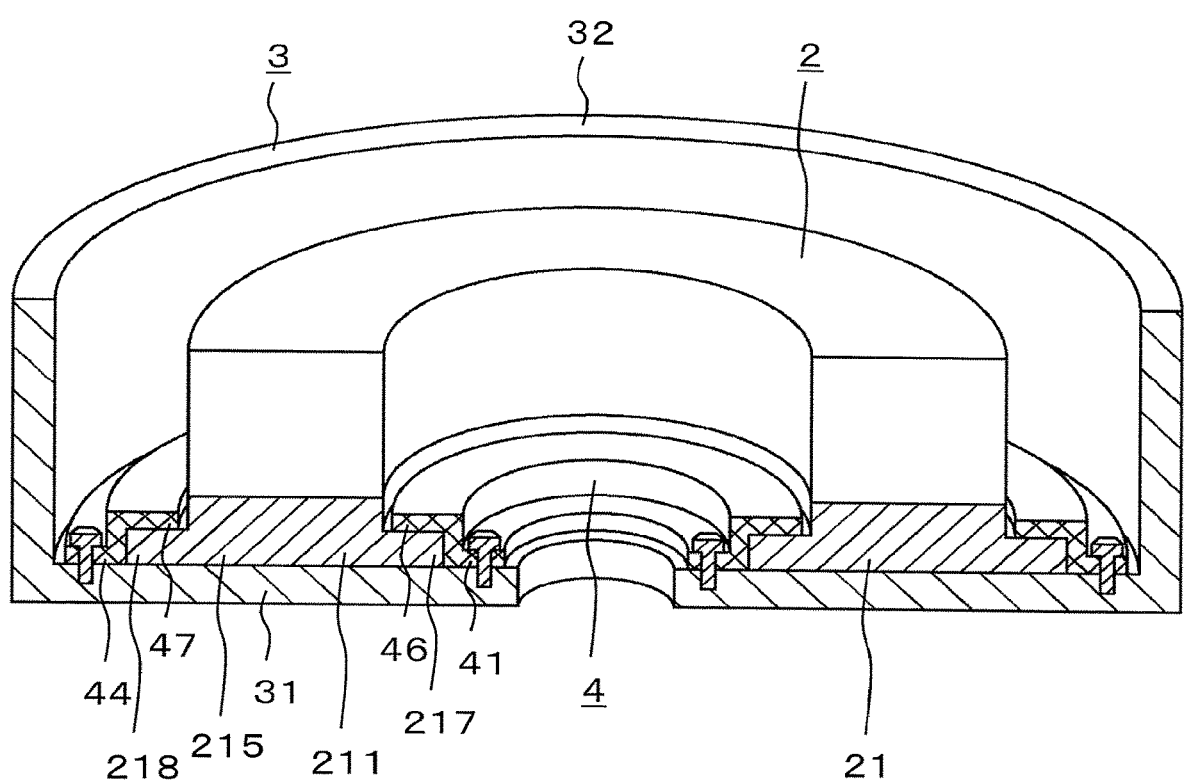
FIG. 24 is a longitudinal sectional view for illustrating a modification example of the stator iron core of FIG. 18.

FIG. 24 is a longitudinal sectional view for illustrating a modification example of the stator iron core 21 of FIG. 18. In FIG. 24, there are illustrated the housing 3 and also the fixing member 4 configured to fix the stator iron core 21 to the housing 3. The core back 211 may include the core back body 215 having the teeth 212, the radially-inner-side overhanging portion 217 extending radially inward from the core back body 215, and the radially-outer-side overhanging portion 218 extending radially outward from the core back body 215. In this case, the fixing member 4 may include the radially-inner-side fixing portion 41 that is fixed to the bottom 31 on the radially inner side of the radially-inner-side overhanging portion 217, a pressing portion 46 that is fixed to the radially-inner-side fixing portion 41 and presses one axial surface in the radially-inner-side overhanging portion 217 toward the bottom 31, the radially-outer-side fixing portion 44 that is fixed to the bottom 31 on the radially outside of the radially-outer-side overhanging portion 218, and the pressing portion 47 that is fixed to the radially-outer-side fixing portion and presses one axial surface in the radially-outer-side overhanging portion 218 toward the bottom 31. In FIG. 24, the pressing portion 46 has an annular shape, but it may be a hook portion extending radially outward from the radially-inner-side fixing portion 41, and the pressing portion 47 has an annular shape, but it may be a hook portion extending radially inward from the radially-outer-side fixing portion 44.

Although the configuration of the axial gap rotating electrical machine including a pair of axially separated stators 2 has been described in each of the above embodiments, an axial gap rotating electrical machine including one stator 2 may be used. In this case, when a member made of, for example, iron which serves as a core back is provided on the surface axially opposite to the surface of the rotor 1 which faces the stator 2, the magnetomotive force of the axial gap rotating electrical machine can be increased.

Further, although the configuration of the permanent magnet 12 and the tooth 212 having the fan shapes as seen in the axial direction has been described in each of the above embodiments, the permanent magnet 12 and the tooth 212 are not limited to having the fan shapes, but may have rectangular shapes as seen in the axial direction, for example.

Figure 25:
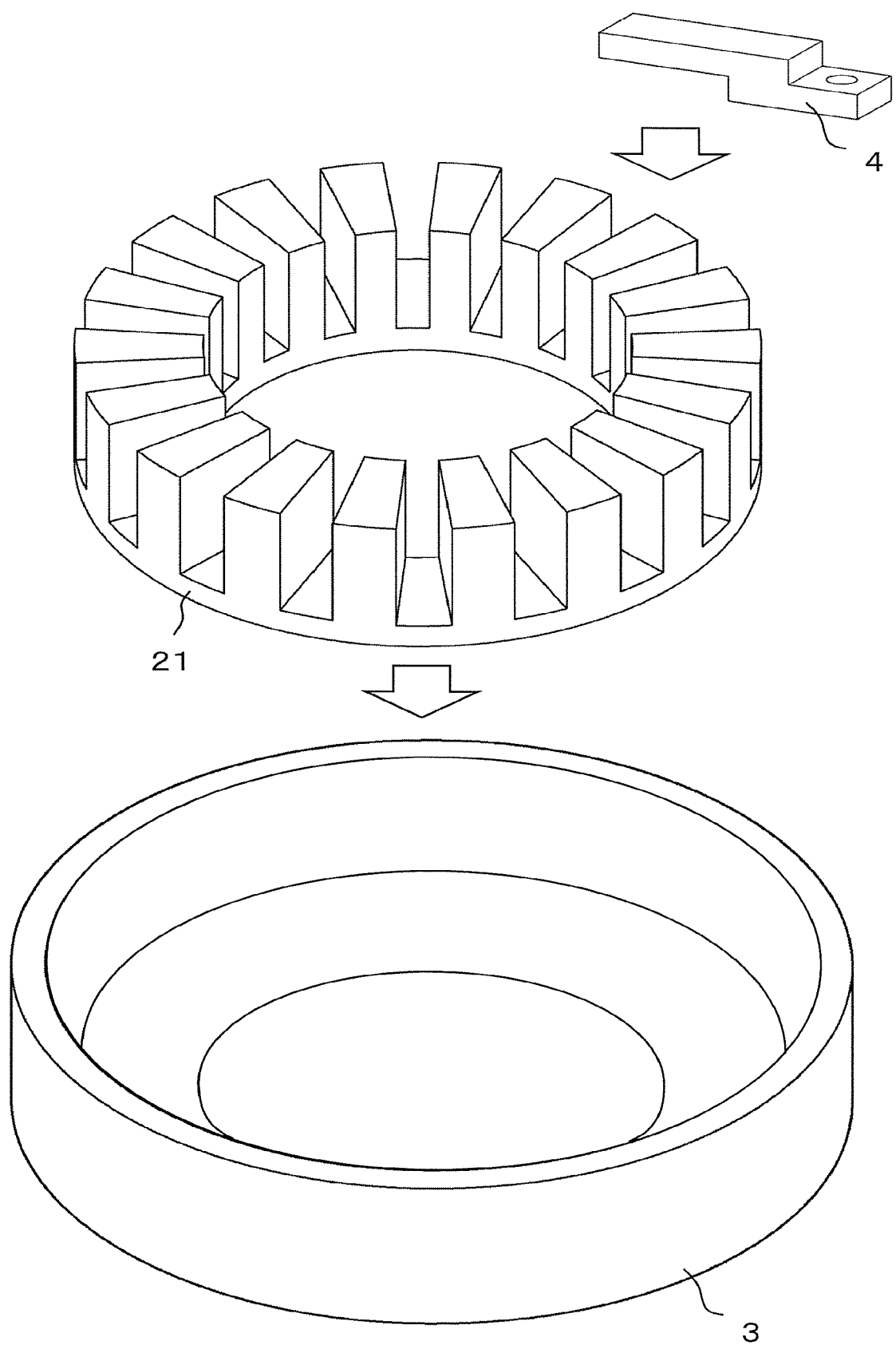
FIG. 25 is an explanatory view for illustrating a method of fixing the stator iron core and the fixing member to the housing.

FIG. 25 is an explanatory view for illustrating a method of fixing the stator iron core and the fixing member to the housing. The stator iron core 21 and the fixing member 4 are characterized by being fixed to the housing 3 as moved axially toward the bottom. After the stator iron core 21 has been set axially to the housing 3, the fixing member 4 is set axially, and the stator iron core 21 and the fixing member 4 are fixed to the housing 3 through use of the bolts or the like.

Figure 26:
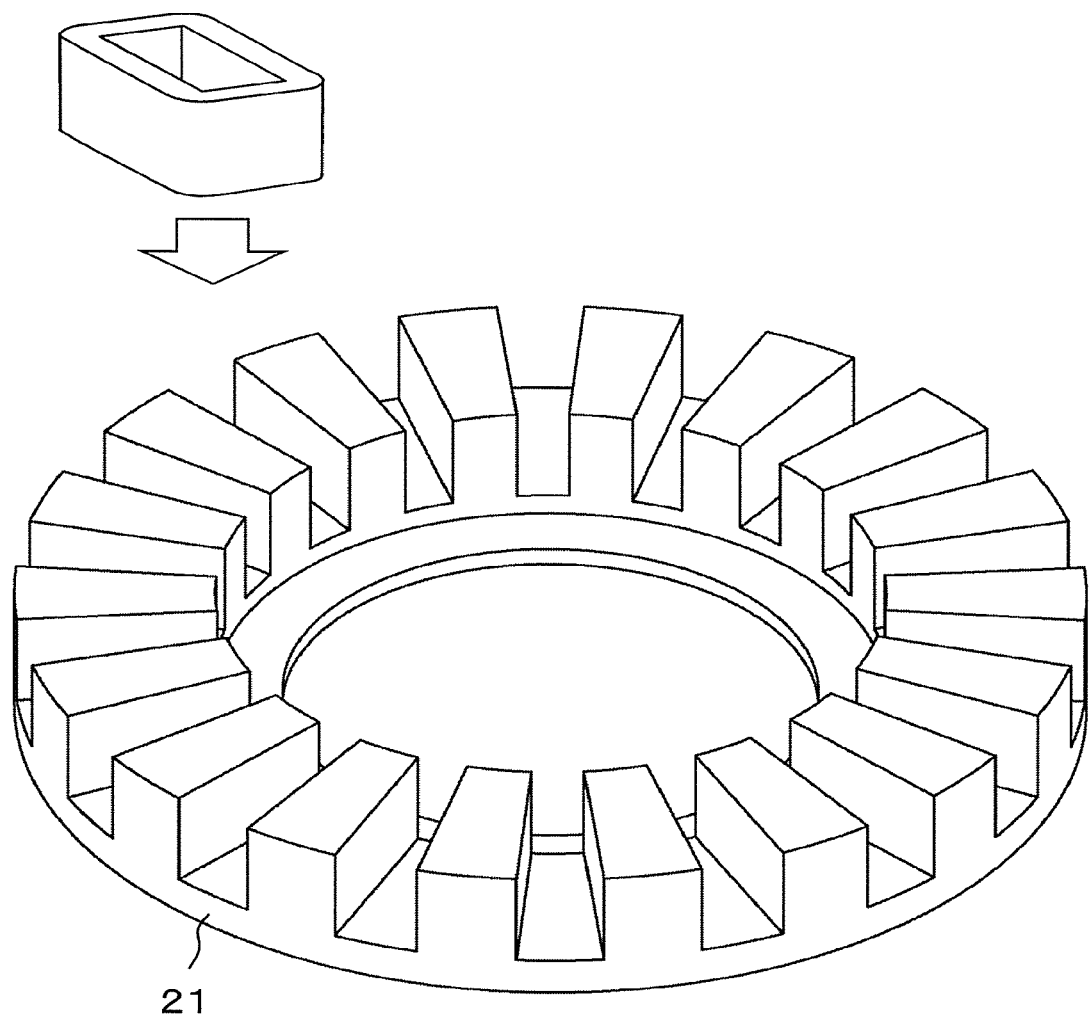
FIG. 26 is an explanatory view for illustrating a method of providing a winding on the stator iron core including a radially-inner-side fixing portion.
Figure 27:
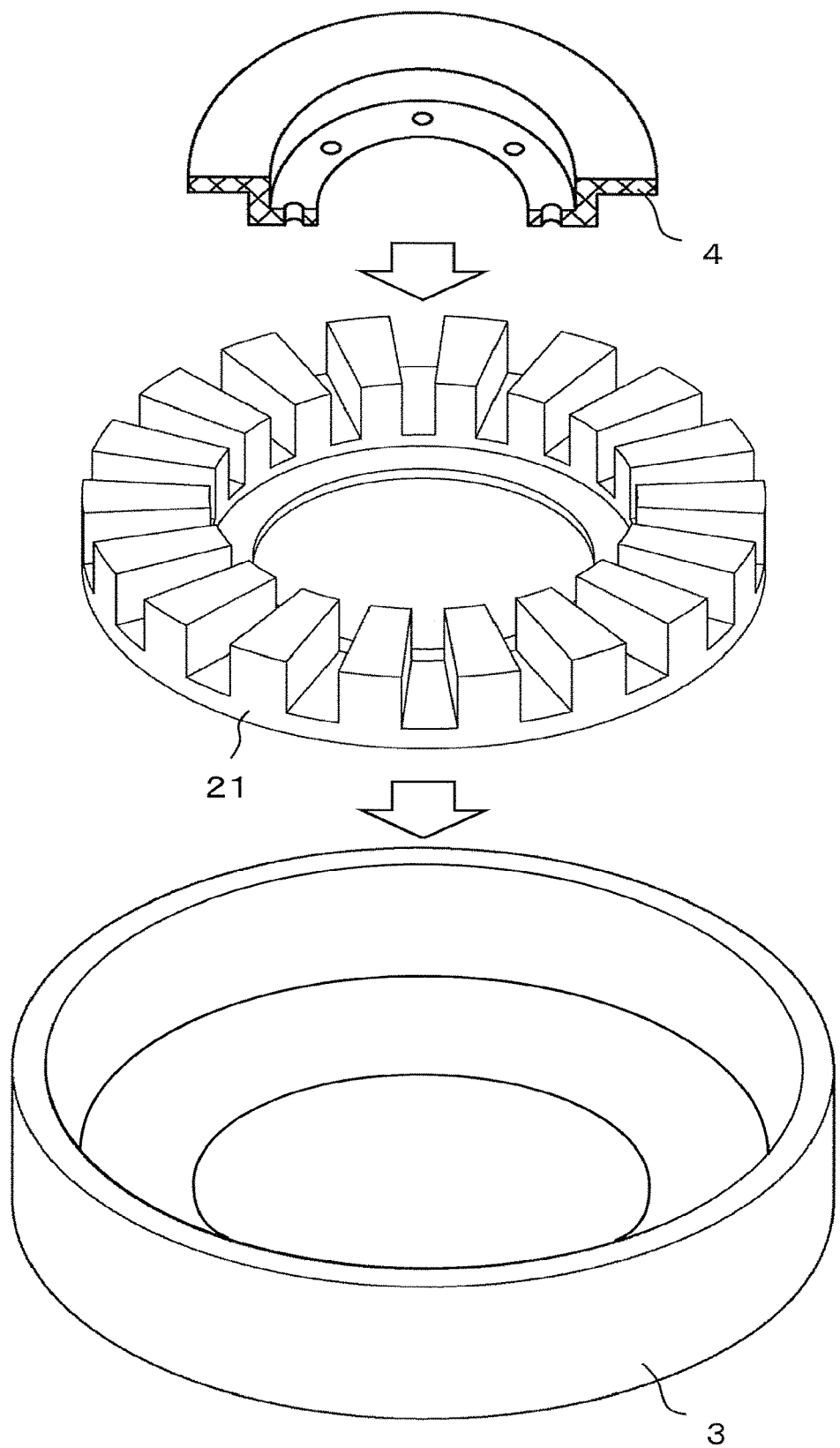
FIG. 27 is an explanatory view for illustrating a method of fixing the stator iron core of FIG. 26 to the housing together with the fixing member.

FIG. 26 is an explanatory view for illustrating a method to provide the winding on the stator iron core including the radially-inner-side fixing portion, and FIG. 27 is an explanatory view for illustrating a method to fix the stator iron core of FIG. to the housing together with the fixing member. It is characterized in that, after the winding process for providing the winding on the stator iron core 21 has been performed, a stator iron core fixing process of fixing the stator iron core 21 and the fixing member 4 to the housing 3 is performed. An assembly process is facilitated by fixing the stator iron core 21 to the housing 3 after providing the winding on the stator iron core 21.

As the winding, a coil assembly formed by providing a winding on an insulating bobbin in advance may be used, or after attachment of an insulator for insulation, a winding may be provided on each tooth.

The fixing member 4 is fixed to the housing 3 through use of the bolt or the like. It is preferred that the fixing member be circumferentially provided such that the bolts are circumferentially arranged at equal pitches. It is preferred that diagonal tightening, in which the bolts on a diagonal line are tightened, be performed after temporary tightening of all bolts. The accuracy in flatness of the counter surface of the rotor 1 of the stator iron core 21 can be improved by performing the diagonal tightening.

The invention claimed is:

1. An axial gap rotating electrical machine comprising:
a rotor;
a stator which includes a stator iron core, the stator iron core including:
a core back having a hollow-disc shape; and
a plurality of teeth, which axially extend from one axial surface of the core back, and are arrayed circumferentially, the plurality of teeth having distal ends axially facing the rotor;
a housing having a bottom with which another axial surface of the core back is in contact; and a fixing member configured to press the one axial surface of a portion of the core back which faces a slot being a space between circumferentially adjacent teeth toward the bottom, wherein the fixing member is in direct contact with one axial surface of the core back.

2. The axial gap rotating electrical machine according to claim 1, wherein the fixing member is fixed to the bottom at a position radially shifted from the core back.

3. The axial gap rotating electrical machine according to claim 1, wherein the stator iron core is formed of radially laminated electromagnetic steel plates.

4. The axial gap rotating electrical machine according to claim 1,
wherein a groove that is open to a slot side is formed so as to extend in a radially entire part in a portion of the core back which faces the slot being a space between circumferentially adjacent teeth, and
wherein the fixing member includes:
a radially-inner-side fixing portion that is fixed to the bottom on a radially inner side of the core back;
a radially-outer-side fixing portion that is fixed to the bottom on a radially outer side of the core back; and
a pressing portion that is fixed to the radially-inner-side fixing portion and the radially-outer-side fixing portion and in contact with one axial surface in the groove.

5. The axial gap rotating electrical machine according to claim 1,
wherein the core back includes:
a core back body having the plurality of teeth; and
a radially-inner-side overhanging portion extending radially inward from the core back body, and
wherein the fixing member is in contact with one axial surface in the radially-inner-side overhanging portion.

6. The axial gap rotating electrical machine according to claim 5, wherein the fixing member includes:
a radially-inner-side fixing portion that is fixed to the bottom on a radially inner side of the radially-inner-side overhanging portion; and
a hook portion that is fixed to the radially-inner-side fixing portion and in contact with one axial surface in the radially-inner-side overhanging portion.

7. The axial gap rotating electrical machine according to claim 5, wherein the fixing member includes:
a radially-inner-side fixing portion having a hollow-disc shape and fixed to the bottom on a radially inner side of the radially-inner-side overhanging portion; and
a pressing portion that is fixed to the radially-inner-side fixing portion and in contact with one axial surface in the radially-inner-side overhanging portion.

8. The axial gap rotating electrical machine according to claim 1,
wherein the core back includes:
a core back body having the plurality of teeth; and
a radially-outer-side overhanging portion extending radially outward from the core back body, and
wherein the fixing member is in contact with one axial surface in the radially-outer-side overhanging portion.

9. The axial gap rotating electrical machine according to claim 8, wherein the fixing member includes:
a radially-outer-side fixing portion that is fixed to the bottom on a radially outer side of the radially-outer-side overhanging portion; and
a hook portion that is fixed to the radially-outer-side fixing portion and in contact with one axial surface in the radially-outer-side overhanging portion.

10. The axial gap rotating electrical machine according to claim 8, wherein the fixing member includes:
a radially-outer-side fixing portion having a hollow-disc shape and fixed to the bottom on a radially outer side of the radially-outer-side overhanging portion; and
a pressing portion that is fixed to the radially-outer-side fixing portion and in contact with one axial surface in the radially-outer-side overhanging portion.

11. A manufacturing method for an axial gap rotating electrical machine of claim 1, the manufacturing method comprising a stator iron core fixing step of fixing the stator iron core and the fixing member to the bottom of the housing.

12. The manufacturing method for an axial gap rotating electrical machine according to claim 11, the method further comprising a winding step of mounting a winding on the stator iron core before the stator iron core fixing step.

13. The axial gap rotating electrical machine according to claim 1, wherein the fixing member is L-shaped.

14. The axial gap rotating electrical machine according to claim 1, wherein the fixing member extends between the circumferentially adjacent teeth into the slot.

15. An axial gap rotating electrical machine comprising:
a rotor;
a stator which includes a stator iron core, the stator iron core including:
a core back having a hollow-disc shape; and
a plurality of teeth, which axially extend from one axial surface of the core back, and are arrayed circumferentially, the plurality of teeth having distal ends axially facing the rotor and also having walls circumferentially facing each other between adjacent teeth;
a housing having a bottom with which another axial surface of the core back is in contact; and
a fixing member configured to press the one axial surface of the core back toward the bottom;
wherein a groove that is open to a slot side is formed so as to extend to a radially inner end in a portion of the core back which faces the slot being a space between circumferentially adjacent teeth, as well as a radially inner portion, and
wherein the fixing member includes:
a radially-inner-side fixing portion that is fixed to the bottom on a radially inner side of the core back; and
a hook portion that is fixed to the radially-inner-side fixing portion and in contact with one axial surface in the groove, wherein
the groove is spaced apart from the walls of the two adjacent teeth within the slot.

16. The axial gap rotating electrical machine according to claim 15, wherein the radially-inner-side fixing portion is formed so as to extend along an inner circumferential surface of the core back.

17. The axial gap rotating electrical machine according to claim 15, wherein
the groove has a step portion whose surface is lower than the surface of the core back.

18. An axial gap rotating electrical machine comprising:
a rotor;
a stator which includes a stator iron core, the stator iron core including:
a core back having a hollow-disc shape; and
a plurality of teeth, which axially extend from one axial surface of the core back, and are arrayed circumferentially, the plurality of teeth having distal ends axially facing the rotor and also having walls circumferentially facing each other between adjacent teeth;
a housing having a bottom with which another axial surface of the core back is in contact; and
a fixing member configured to press the one axial surface of the core back toward the bottom;
wherein a groove that is open to a slot side is formed so as to extend to a radially outer end in a portion of the core back which faces the slot being a space between circumferentially adjacent teeth, as well as a radially outer portion, and
wherein the fixing member includes:
a radially-outer-side fixing portion that is fixed to the bottom on a radially outer side of the core back; and
a hook portion that is fixed to the radially-outer-side fixing portion and in contact with one axial surface in the groove, wherein
the groove is spaced apart from the walls of the two adjacent teeth within the slot.

19. The axial gap rotating electrical machine according to claim 18,
wherein the core back includes:
a core back body in which the groove is formed; and
a thick portion protruding from the core back body in a direction opposite to the direction in which the tooth extends from the core back body, and
wherein the thick portion is arranged so as to overlap with the groove as seen in an axial direction.

20. The axial gap rotating electrical machine according to claim 18, wherein the radially-outer-side fixing portion is formed so as to extend along an outer circumferential surface of the core back.

21. The axial gap rotating electrical machine according to claim 18, wherein
the groove has a step portion whose surface is lower than the surface of the core back.

* * * * *